United States Patent
Ahn et al.

(10) Patent No.: US 10,111,566 B2
(45) Date of Patent: Oct. 30, 2018

(54) ROBOT CLEANER, TERMINAL APPARATUS, AND METHOD OF CONTROLLING THE SAME

(71) Applicant: Samsung Electronics Co., Ltd., Gyeonggi-do (KR)

(72) Inventors: Seong-hun Ahn, Incheon (KR); Yong-ju Kim, Seoul (KR); Se-o Lee, Gyeonggi-do (KR); Soo-yeun Yang, Seoul (KR); Sang-sung Woo, Seoul (KR); Jong-chan Kwon, Gyeonggi-do (KR); Yang-jic Lee, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 187 days.

(21) Appl. No.: 14/943,788

(22) Filed: Nov. 17, 2015

(65) Prior Publication Data
US 2016/0135655 A1    May 19, 2016

(30) Foreign Application Priority Data

Nov. 17, 2014 (KR) ........................ 10-2014-0160284

(51) Int. Cl.
*A47L 9/28* (2006.01)
*G05D 1/00* (2006.01)

(52) U.S. Cl.
CPC .......... *A47L 9/2826* (2013.01); *G05D 1/0038* (2013.01); *G05D 1/0044* (2013.01); *A47L 2201/06* (2013.01); *G05D 2201/0215* (2013.01)

(58) Field of Classification Search
CPC ..................................................... A47L 9/2826
See application file for complete search history.

(56) References Cited

U.S. PATENT DOCUMENTS

| 8,463,018 | B2 | 6/2013 | Chung et al. |
| 8,924,042 | B2 | 12/2014 | Kim et al. |
| 2004/0128031 | A1 | 7/2004 | Wang |
| 2005/0166355 | A1* | 8/2005 | Tani ..................... A47L 9/2805 |
| | | | 15/319 |

(Continued)

FOREIGN PATENT DOCUMENTS

| JP | 2006-209644 | 8/2006 |
| KR | 1020060027726 | 3/2006 |

(Continued)

OTHER PUBLICATIONS

Ioka et al., Aug. 2006, JP 2006-209644A, English machine translation.*

(Continued)

*Primary Examiner* — Jason Y Ko
(74) *Attorney, Agent, or Firm* — The Farrell Law Firm, P.C.

(57) ABSTRACT

A robot cleaner is provided that includes a driver configured to move the robot cleaner, and a suction unit configured to suck foreign objects from a surface below the robot cleaner. The robot cleaner also includes a detector configured to capture images of regions disposed in front of the robot cleaner. The robot cleaner further includes a controller configured to control the detector to capture a first image of a region before cleaning, control the detector to capture a second image of the region after cleaning, and generate cleaning result information using the first and second images.

11 Claims, 27 Drawing Sheets

(56) References Cited

U.S. PATENT DOCUMENTS

| | | |
|---|---|---|
| 2006/0061657 A1 | 3/2006 | Rew et al. |
| 2011/0138550 A1 | 6/2011 | Park |
| 2012/0109376 A1 | 5/2012 | Lee et al. |
| 2012/0158915 A1 | 6/2012 | Ham et al. |
| 2012/0259481 A1 | 10/2012 | Kim |
| 2014/0207280 A1 | 7/2014 | Duffley et al. |

FOREIGN PATENT DOCUMENTS

| | | |
|---|---|---|
| KR | 1020060078099 | 7/2006 |
| KR | 100791382 | 1/2008 |
| KR | 100833125 | 5/2008 |
| KR | 1020120114671 | 10/2012 |
| KR | 1020120116283 | 10/2012 |
| KR | 1020130092729 | 8/2013 |
| KR | 101322510 | 10/2013 |
| KR | 101352518 | 1/2014 |
| KR | 101352668 | 1/2014 |
| KR | 1020140063119 | 5/2014 |
| KR | 101412590 | 6/2014 |
| KR | 101401694 | 7/2014 |
| WO | WO 2015/144202 | 10/2015 |

OTHER PUBLICATIONS

International Search Report dated Feb. 25, 2016 issued in counterpart application No. PCT/KR2015/012331, 12 pages.
European Search Report dated Jun. 18, 2018 issued in counterpart appln. No. 15861427.1-1018, 10 pages.

\* cited by examiner

ROBOT CLEANER, TERMINAL APPARATUS, AND METHOD OF CONTROLLING THE SAME

PRIORITY

This application claims priority under 35 U.S.C. § 119(a) to Korean Patent Application No. 10-2014-0160284, filed on Nov. 17, 2014, in the Korean Intellectual Property Office, the disclosure of which is incorporated herein by reference.

BACKGROUND

1. Field of the Disclosure

The present disclosure relates generally to a robot cleaner, a terminal apparatus, and a method of controlling the same, and more particularly, to a robot cleaner, a terminal apparatus, and a method of controlling the same, which are capable of comparing a cleaning plan and a cleaning result of a robot cleaner, and reporting a comparison result to a user.

2. Description of the Related Art

In general, robots have been developed for industrial use, and have been widely used in various industrial fields. In recent years, robots have been used in medical fields, aerospace fields, and regular homes.

One such robot type used in homes is a robot cleaner. The robot cleaner performs a cleaning function by suctioning foreign materials, such as dust, while navigating itself through an interior space of the home.

However, traditional robot cleaners do not provide detailed information to the user on a cleaning method that is performed, and a region that is not cleaned in the cleaning process.

For example, the robot cleaner avoids regions of the floor where an object larger than a preset size is disposed. Thus, the user may understand that the robot cleaner does not thoroughly clean an entire area.

The robot cleaner may not have an adaptive cleaning schedule, in that cleaning jobs are reserved only according to a single preset schedule and operate based on the reserved cleaning job. For example, in response to the party being scheduled by the user at 12:00 PM on Saturday in a state that the cleaning schedule is set at 12:00 PM every day, it is inconvenient for the user to have to control ON/OFF of the robot cleaner according to whether or not to perform the each cleaning job.

SUMMARY

The present disclosure has been made to address at least the above problems and/or disadvantages and to provide at least the advantages described below. Accordingly, an aspect of the present disclosure provides a robot cleaner, a terminal apparatus, and a method of controlling the same, which are capable of comparing a cleaning plan and a cleaning result of a robot cleaner, and reporting a comparison result to a user.

Another aspect of the present disclosure provides a robot cleaner, a terminal apparatus, and a method of controlling the same, which are capable of performing cleaning by rapidly determining whether to suck or bypass an object detected during the cleaning.

According to an aspect of the present disclosure, a robot cleaner is provided that includes a driver configured to move the robot cleaner, and a suction unit configured to suck foreign objects from a surface below the robot cleaner. The robot cleaner also includes a detector configured to capture images of regions disposed in front of the robot cleaner. The robot cleaner further includes a controller configured to control the detector to capture a first image of a region before cleaning, control the detector to capture a second image of the region after cleaning, and generate cleaning result information using the first and second images.

According to another aspect of the present disclosure, a terminal apparatus connectable to a robot cleaner is provided. The terminal apparatus includes a communication interface configured to receive cleaning schedule information of the robot cleaner and cleaning result information including a first image of a region before cleaning and a second image of the region after cleaning from the robot cleaner. The terminal apparatus also includes a display configured to display the cleaning schedule information and the cleaning result information. The terminal apparatus further includes a controller configured to control the display to simultaneously display the first image and the second image.

According to an additional aspect of the present disclosure, a method is provided for controlling a robot cleaner. The robot cleaner is moved along a preset path. Foreign objects are sucked from a surface below the robot cleaner while the robot cleaner moves along the preset path. A first image of a region is captured before cleaning and a second image of the region is captured after cleaning. Cleaning result information is generated using the first and second images.

According to a further aspect of the present disclosure, a method is provided for controlling a terminal apparatus connectable to a robot cleaner. Cleaning schedule information of the robot cleaner and cleaning result information including a first image of a region before cleaning and a second image of the region after cleaning by the robot cleaner, are received. The cleaning schedule information and the cleaning result information are displayed.

According to another aspect of the present disclosure, a non-transitory computer readable medium is provided with computer executable instructions stored thereon executed by a processor to perform a method of controlling a robot cleaner. The method includes moving the robot cleaner along a preset path, sucking foreign objects from a surface below the robot cleaner while the robot cleaner moves along the preset path. The method also includes capturing a first image of a region before cleaning and a second image of the region after cleaning, and generating cleaning result information using the first and second images.

According to another aspect of the present disclosure, a non-transitory computer readable medium is provided with computer executable instructions stored thereon executed by a processor to perform a method of controlling a terminal apparatus connectable to a robot cleaner. The method includes receiving cleaning schedule information of the robot cleaner and cleaning result information including a first image of a region before cleaning and a second image of the region after cleaning by the robot cleaner. The method also includes displaying the cleaning schedule information and the cleaning result information.

BRIEF DESCRIPTION OF THE DRAWINGS

The above and/or other aspects, features, and advantages of the present disclosure will be more apparent from the following detailed description when taken in conjunctions with the accompanying drawings, in which.

DETAILED DESCRIPTION

Figure 1:
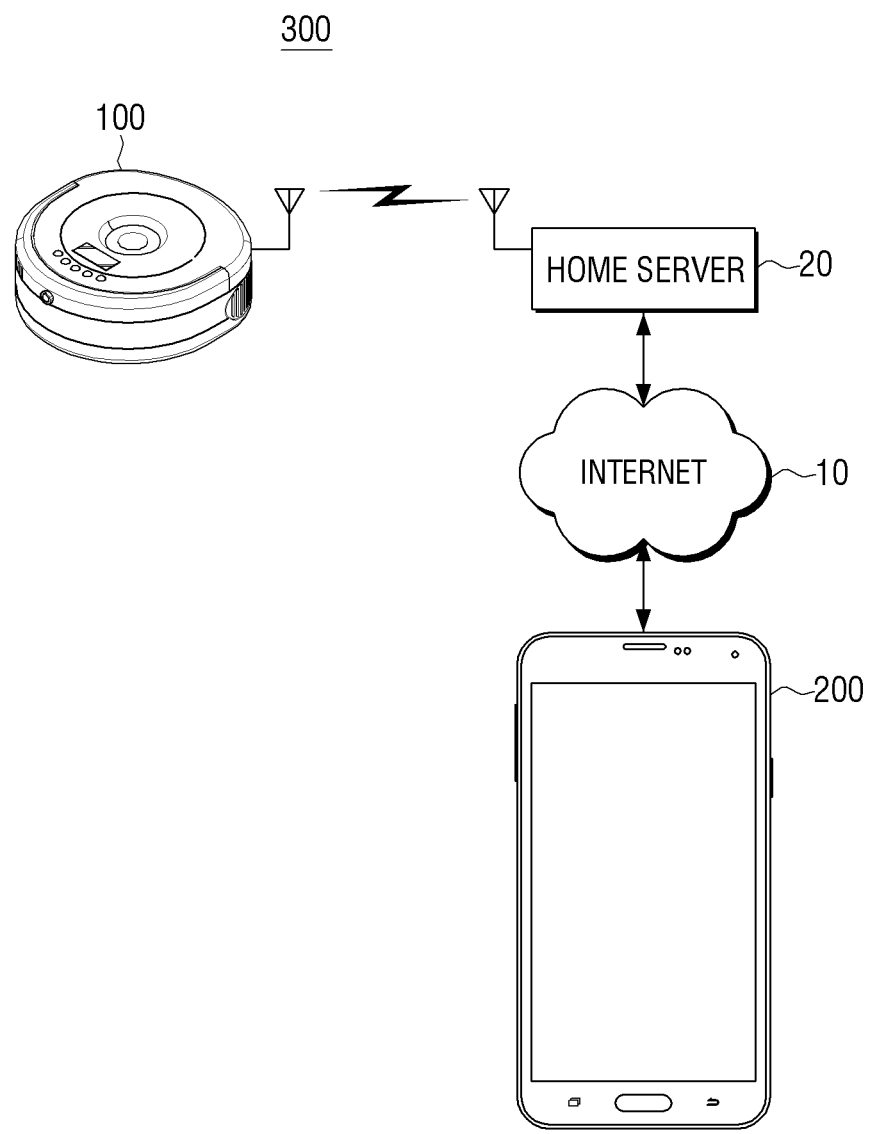
FIG. 1 is a block diagram illustrating a configuration of a cleaning system, according to an embodiment of the present disclosure.

Embodiments of the present disclosure are described in detail with reference to the accompanying drawings. The same or similar components may be designated by the same or similar reference numerals although they are illustrated in different drawings. Detailed descriptions of constructions or processes known in the art may be omitted to avoid obscuring the subject matter of the present disclosure.

The terms "first", "second", etc., may be used to describe diverse components, but the components are not limited by those terms. The terms are only used to distinguish one component from the others.

The terms used herein are only used to describe the embodiments and are not intended to limit the scope of the disclosure. A singular expression also includes its plural meaning as long as it does not change the context. Herein, the terms "include" and "consist of" designate the presence of features, numbers, steps, operations, components, elements, or a combination thereof, but do not exclude the presence or possibility of one or more additional features, numbers, steps, operations, components, elements, or a combination thereof.

Herein, a module or a unit performs at least one function or operation, and may be implemented with hardware, software, or a combination of hardware and software. In addition, a plurality of modules or a plurality of units may be integrated into at least one module, except for a module or a unit that must be implemented with specific hardware, and may be implemented with at least one processor.

FIG. 1 is a block diagram illustrating a configuration of a cleaning system, according to an embodiment of the present disclosure.

Referring to FIG. 1, a cleaning system 300 includes a robot cleaner 100, a home server 20, and a terminal apparatus 200.

The home server 20 couples the robot cleaner 100 and the terminal apparatus 200. For example, the home server 20 may transmit cleaning result information of the robot cleaner 100 to the terminal apparatus 200 through Internet 10. The home server 20 may provide cleaning schedule information generated in the terminal apparatus 200 to the robot cleaner 100. The home server 20 may be a gateway of a smart home system configured to control a plurality of home appliances, or a charge station configured to support charging of the robot cleaner 100.

The cleaning result information may include information before cleaning and information after the cleaning, and may also include images of the same region before and after the cleaning. The cleaning result information may further include map information generated in the robot cleaner, moving path information of the robot cleaner, an image of a sucked object, a kind of the sucked object, position information of the sucked object, non-cleaning region information (image and position), and the like.

The robot cleaner 100 may be drivable, and may suck dust off a floor surface. The robot cleaner 100 may perform the cleaning according to a cleaning schedule transferred from the terminal apparatus 200. In the cleaning process, the robot cleaner 100 may detect an object in front it, determine whether or not to suck the detected object, and perform cleaning by sucking the corresponding object or bypassing the corresponding object according to the determination result. The robot cleaner 100 may generate the cleaning result information, which includes the information before the cleaning and the information after the cleaning, after the cleaning is completed. A detailed configuration of the robot cleaner 100 is described in greater detail below with reference to FIG. 2.

The terminal apparatus 200 may generate the cleaning schedule based on user schedule information, and provide the generated cleaning schedule to the robot cleaner 100. The terminal apparatus 200 may receive the cleaning result information from the robot cleaner 100, and display the cleaning schedule and cleaning result information of the robot cleaner 100 to the user. A detailed configuration and operation of the terminal apparatus 200 is described in greater detail below with reference to FIG. 8.

The cleaning system 300, according to an embodiment of the present disclosure, may change or generate the cleaning schedule of the robot cleaner according to the user schedule information. The cleaning system 300, according to an embodiment of the present disclosure, may provide the cleaning plan and cleaning result to the user, and thus, the user may easily confirm the cleaning result, a non-cleaning region, and the like.

FIG. 1 illustrates the cleaning system 300 in which the robot cleaner 100 is coupled to the terminal apparatus 200 through the home server 20 and the Internet 10, however, the robot cleaner 100 may be directly coupled to the terminal apparatus 200 or the robot cleaner 100 may be coupled to the terminal apparatus 200 only through the home server 20 without the Internet 10.

The robot cleaner 100 may acquire user information from the home server, which has knowledge of a user schedule, and the robot cleaner 100 may directly generate the cleaning schedule.

FIG. 1 has illustrated that one robot cleaner and one terminal apparatus are coupled in the cleaning system 300, however, a plurality of robot cleaners may be presented in the cleaning system 300, and may be simultaneously operated. For example, each of the plurality of robot cleaners may be coupled to a plurality of terminal apparatuses. In another example, one terminal apparatus may be coupled to a plurality of robot cleaners.

Figure 2:
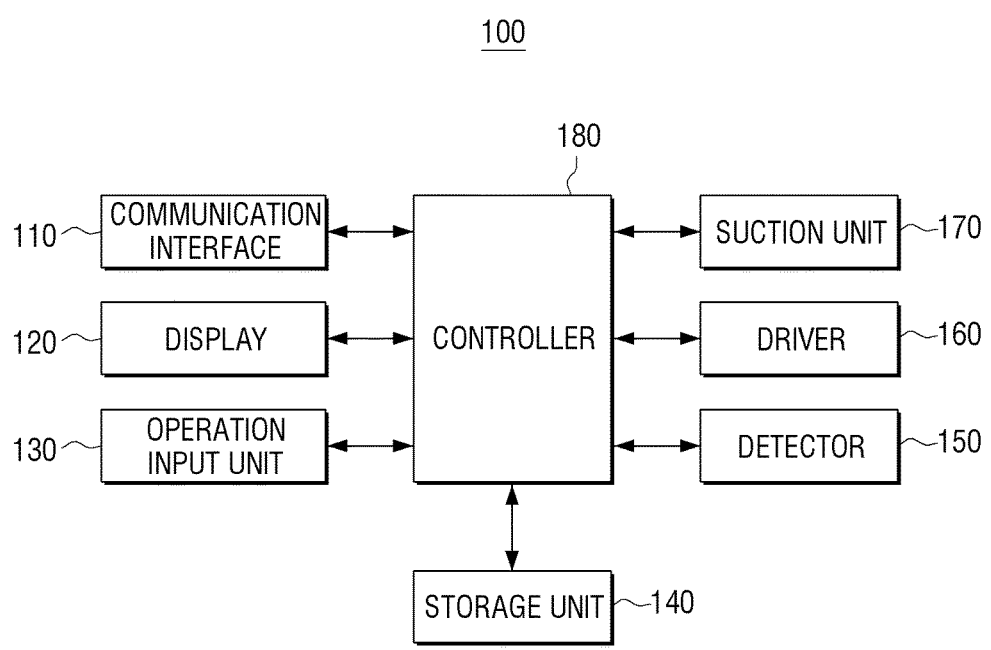
FIG. 2 is a block diagram illustrating a configuration of a robot cleaner of FIG. 1, according to an embodiment of the present disclosure.

FIG. 2 is a block diagram illustrating a configuration of the robot cleaner of FIG. 1, according to an embodiment of the present disclosure.

Referring to FIG. 2, the robot cleaner 100, according to an embodiment of the present disclosure, includes a communication interface 110, a display 120, an operation input unit 130, a storage unit 140, a detector 150, a driver 160, a suction unit 170, and a controller 180.

The communication interface 110 may be configured to couple the robot cleaner 100 to an external apparatus (for example, the terminal apparatus or the home server). The communication interface 110 may be connected through a short-range wireless communication method (for example, Bluetooth, WiFi, WiFi direct, and the like) or a long-distance wireless communication method (for example, global system for mobile communication (GSM), universal mobile telephone system (UMTS), long term evolution (LTE), wireless broadband (WiBRO), and the like).

The communication interface 110 may receive schedule information. For example, the communication interface 110 may receive the user schedule information from the terminal apparatus 200 or a server having a user account.

The communication interface 110 may transmit the cleaning result information. For example, in response to the cleaning schedule being generated in the terminal apparatus 200, the communication interface 110 may receive the cleaning schedule information from the terminal apparatus 200.

The communication interface 110 may transmit the cleaning result information. The communication interface 110 may transmit the cleaning result information to the terminal apparatus 200 at the time that cleaning is completed or in response to a request for information received from the terminal apparatus 200. The cleaning result information may include images before and after the cleaning, from which the user can confirm the cleaning states. The cleaning result information may further include map information generated in the robot cleaner, moving path information of the robot cleaner on the map, an image of a sucked object, a kind of sucked object, position information of the sucked object, non-cleaning region information, and the like.

The communication interface 110 may transmit error information. For example, in response to a state in which the robot cleaner 100 is in contact with liquid that is detected through the detector 150, the communication interface 110 may transmit error information to the terminal apparatus 200 informing that the robot cleaner 100 cannot be driven.

The display 120 may display various types of information supported by the robot cleaner 100. The display 120 may be a small sized monitor such as, for example, a liquid crystal display (LCD). The display 120 may be implemented with a touch screen capable of simultaneously performing a function of the operation input unit 130.

The display 120 may display information such as an operation state (cleaning mode or sleep mode) of the robot cleaner 100, information related to a cleaning process (for example, cleaning processing time, current cleaning mode (for example, suction intensity)), battery information, a charging state, a dust filling state in a dust container, and an error state (liquid contact state). In response to an error being detected, the display 120 may display the detected error. The display 120 may display information for an object detected through the detector 150.

The operation input unit 130 may include a plurality of function keys, which the user may set, or through which the user may select various types of functions supported by the terminal apparatus 200. For example, the operation input unit 130 may be implemented with a device having a plurality of buttons. In another example, the operation input unit 130 may be implemented with a touch screen capable of simultaneously performing a function of the display 120.

The operation input unit 130 may receive an ON/OFF command of a cleaning function of the robot cleaner 100, a selection of the cleaning mode, a re-cleaning command for the non-cleaning region, and the like.

The storage unit 140 may store various types of programs and data that required for operation of the robot cleaner 100. The storage unit 140 may be implemented with a nonvolatile memory, volatile memory, a flash memory, a hard disc drive (HDD), a solid state drive (SSD), and the like.

The storage unit 140 may store the cleaning schedule information received through the communication interface 110 or the cleaning schedule information autonomously generated therein. The storage unit 140 may store a plurality of pieces of cleaning schedule information according to different cleaning time zones. For example, the storage unit 140 may store first schedule information that performs cleaning at 12:00 PM on weekdays, second schedule information that performs cleaning at 2:00 PM on the weekend, and the like. In another embodiment, one of the plurality of pieces of schedule information may be a sporadic schedule.

The storage unit 140 may store a cleaning map generated according to the driving of the driver 160. The storage unit 140 may store an image captured through the detector 150. The storage unit 140 may store position information of an object located in the captured image.

The storage unit 140 may store a history and the like generated in the cleaning process as history information. The history information may include a cleaning time, information for the charging number, information for the error occurrence number, error information, information for the non-cleaning region, and the like.

The detector 150 may detect obstacles around the robot cleaner 100. For example, the detector 150 may detect a position of an obstacle around the robot cleaner 100 and a distance to the obstacle using a supersonic sensor, an infrared sensor, a radio frequency (RF) sensor, and the like. The detector 150 may further include a collision sensor configured to detect the obstacle through a collision with the obstacle.

The detector 150 may detect an object located in front of the robot cleaner 100. For example, the detector 150 may include a capturing unit configured to capture an image of a region in front of the robot cleaner 100, and the detector 150 may detect the object from the image captured in the capturing unit through image processing. The detector 150 may store the image captured with respect to the object, which may be sucked or bypassed, in the storage unit 140.

The detector 150 may determine the kind of the object based on a sound pattern generated in sucking the object. For example, the detector 150 may determine the kind of object by comparing a frequency pattern of the object generated in sucking the object with pre-stored frequency patterns for a plurality of objects. The detector 150 may detect a weight of the sucked object through a load cell provided in the dust container, and may detect the sucked object based on the detected weight and the frequency pattern.

The detector 150 may detect whether or not the robot cleaner 100 is in contact with a liquid. For example, the detector 150 may detect whether or not a wheel constituting the driver 160 of the robot cleaner 100 is in contact with the liquid. In this example, the robot cleaner 100 may be continuously driven in a state that the robot cleaner 100 is in contact with the liquid, and thus, the liquid strained in the robot cleaner 100 may be strained on a floor surface according to the movement of the robot cleaner 100. In response to the robot cleaner 100 straining a liquid (for example, drink, milk, or the like) other than the water, the driving of the robot cleaner 100 may only function to diffuse contaminants.

The detector 150 may detect a degree of dust that exists on the floor surface. For example, the detector 150 may include a dust sensor configured to detect the degree of dust of the air input to the suction unit. When an amount of dust that is detected in real time is reduced to a preset amount, the detector 150 may determine the existence of a well-cleaned state through the dust sensor.

The detector 150 may further include an air exhaust unit configured to exhaust the air on the floor surface. The detector 150 may diffuse dust on the floor surface by discharging the air onto the floor surface on which the cleaning is completed, may detect the dust diffused by the air through the dust sensor. The detector 150 may determine that the cleaning is completed well only when the degree of dust detected through the dust sensor is within a preset range. The detector 150 may determine that the cleaning is not completed well when the degree of dust detected through the dust sensor is outside of the preset range.

The driver 160 may move the robot cleaner. The driver 160 may be coupled to one or more wheels, and may include a driving unit, such as a motor. The driver 160 may perform a driving operation such as moving, stopping, and direction change, according to a control signal of the controller 180.

The suction unit 170 may suck dust that exists on a floor surface below the robot cleaner 100. For example, the suction unit 170 may perform a cleaning operation by sucking foreign material located therebelow during moving or stopping. The suction unit 170 may further include an air cleaning unit configured to purify pollutants from the air.

The suction unit 170 may have a plurality of operation modes. The operation modes may be divided according to a suction intensity. Any one of the operation modes may be set by the user, and the operation mode of the suction unit 170 may be varied according to the weather. For example, the operation mode may be divided into 1 to 5 levels, according to the suction intensity, and the level of the operation mode, which is set as a default by the user, may be 3. In this example, in response to a warning of microdust (yellow dust) being present, the suction unit 170 may be operated, for example, with the suction intensity of the operation mode 4 or 5, which is greater than a default suction intensity.

The controller 180 may control configuration components in the robot cleaner 100. For example, in response to the user schedule information being received from the terminal apparatus 200 or a server, the controller 180 may generate the cleaning schedule of the robot cleaner 100 according to the received user schedule information. For example, the robot cleaner 100 may usually have the cleaning schedule at 18:00 on Wednesday and Saturday. However, when the schedule information indicates that the user will have friends in the home on Friday, the controller 180 may generate a new cleaning schedule so that the cleaning is completed before scheduled occasion on Friday. In another example, when the schedule information indicates that the user will have friends in the home from 17:00 to 19:00 on Saturday, the controller 180 may interrupt the cleaning schedule on Saturday so that the cleaning is not performed at the time of the scheduled occasion, or the controller 180 may change or cancel the existing cleaning schedule so that the cleaning is completed before the time of the scheduled occasion.

The controller 180 may start the cleaning job according to the generated cleaning schedule. The controller 180 may control the suction unit 170 to be operated in an operation mode corresponding to weather information received from the server or the terminal apparatus. For example, with respect to a warning of microdust (yellow dust) in the weather information, the controller 180 may control the suction unit 170 to be operated with a suction intensity that is greater than the default suction intensity. In another example, during a summer with little dust, the controller 180 may control the suction unit 170 to be operated with a suction intensity that is lower than the default suction intensity.

The controller 180 may control the driver 160 to move the robot cleaner according to a pre-stored cleaning map, and may control the suction unit 170 to perform cleaning during the movement or stoppage of the robot cleaner 100.

The controller 180 may control the driver to move the robot cleaner to a charge station, and may control the robot cleaner to be charged when charging is necessary based on a power state of the robot cleaner 100.

The controller 180 may control the driver 160 and the suction unit 170 according to the degree of dust detected through the detector 150. For example, the controller 180 may improve cleaning efficiency by performing repeated driving or reducing the driving speed in a region in which a lot of dust flows, or by increasing the suction force of the suction unit 170. In another example, the controller 180 may control the driver 160 to allow the driving speed to be increased in a region in which flow-in of dust is absent.

When an object is detected in front of the robot cleaner through the detector 150 during the driving of the robot cleaner, the controller 180 may determine whether or not to suck the corresponding object. For example, the controller 180 may preferentially determine whether or not the corresponding object is of a size that is able to be sucked up by the robot cleaner 100.

When the corresponding object is of a size that it is not able to be sucked up by the robot cleaner 100, the controller 180 may determine that the corresponding object is an unsuckable object, and may determine a region in which the corresponding object is located to be a non-cleaning region. When the corresponding object is of a size that is able to be sucked up by the robot cleaner 100, the controller 180 may determine whether or not the corresponding object is a suction-prohibited object, which are previously registered, through image analysis. When the corresponding object is a pre-registered object, the controller 180 may determine that the corresponding object as a non-suckable object, and may determine the corresponding region to be a non-cleaning region. When the corresponding object is of a size that is smaller than the preset size and the corresponding object is not a pre-registered object, the controller 180 may determine the corresponding object to be a suckable object. The operation of determining whether or not to suck an object may only be performed on objects greater than a certain size.

The controller 180 may control the driver 160 to move the robot cleaner so that the robot cleaner 100 may suck the corresponding object, or may control the driver 160 to move the robot cleaner 100 so that the robot cleaner 100 does not suck the corresponding object, according to the determination result. The controller 180 may control the detector 150 to capture the corresponding object. For example, the capturing operation may be performed twice, first, at when the object is detected, and second, when the object is sucked up or bypassed. In this example, with the detector 160 having a single capturing unit, the controller 180 may control the driver 160 to detect the corresponding object when detected through the capturing unit, and the controller 180 may control the driver 160 to allow the capturing unit to view the region in which the corresponding object is located when the corresponding object is sucked up or bypassed (for example, 180 degree rotation in an existing moving direction), and to allow the capturing unit to perform secondary image capturing on the region in which the corresponding object is located.

In another example, when the detector 150 has two capturing units, the controller 180 may control the detector 150 to capture the corresponding object when detected through a first capturing unit disposed in a front region of the robot cleaner 100, and the controller 180 may control the detector 150 to perform secondary capturing on the region in which the corresponding object is located through a second capturing unit disposed in a rear region of the robot cleaner after the robot cleaner bypasses the region in which the corresponding object is located.

The controller 180 may control the detector 150 to detect the degree of dust on the floor surface. For example, in response to an entire region being completed, the controller 180 may control the detector 160 to detect the degree of dust in the region in which the cleaning job is completed, and determine the cleaning state according to the detected degree of dust. The controller 180 may determine whether to continuously perform the cleaning job or to terminate the cleaning job according to the cleaning state. For example, the operation of determining the cleaning state may be performed only on a preset partial region or a randomly selected partial region. In another example, the operation of determining the cleaning state may be performed in preset region units before the cleaning job is completed.

In response to the cleaning being completed, the controller 180 may control the communication interface 110 to provide the cleaning result information to the terminal apparatus 200. The user may check the non-clean region according to the provided confirmation, and thus, the user may arrange the corresponding environment so that the cleaning in the non-cleaning region may be enabled. The user arranges the cleaning environment of the corresponding region, and the user may input a re-cleaning command to the robot cleaner 100. The re-cleaning command may be input through the terminal apparatus 200 or may be input through the operation input unit 130 in the robot cleaner 100.

In response to the re-cleaning command being input, the controller 180 may control the robot cleaner 100 to move to a position corresponding to the non-cleaning region, and to re-clean the corresponding region. For example, the non-cleaning region may be a region in which a pre-registered object (for example, a ring) is located, and thus, the cleaning may not be performed. Accordingly, in response to the corresponding object being removed from the non-cleaning region by the user and the re-cleaning command being input by the user, the controller 180 may control the driver 160 to move the robot cleaner 100 to the non-cleaning region in which the corresponding object was located, and to perform the cleaning in the corresponding region.

The robot cleaner 100, according to an embodiment of the present disclosure, may change or generate the cleaning schedule of the robot cleaner according to the user schedule information, and thus, the robot cleaner 100 may provide a cleaning service adaptive to the user life. The robot cleaner 100, according to an embodiment of the present disclosure, may provide the cleaning result information, from which the cleaning plan and the cleaning result can be easily understood, to the user, and thus, the user may easily check the cleaning result, a region on which the cleaning is not performed, and the like.

Figure 3:
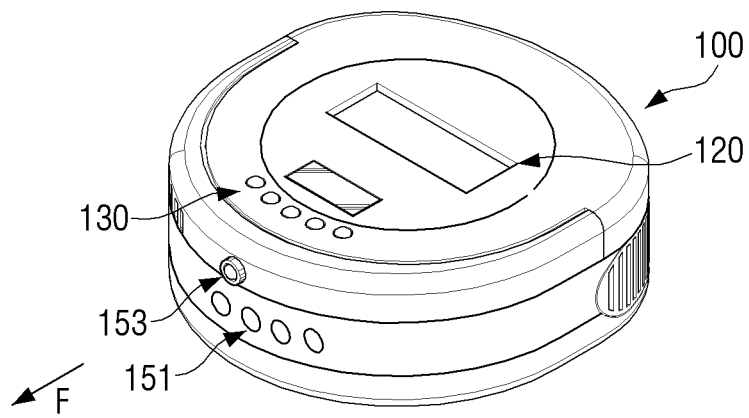
FIG. 3 is a diagram illustrating a perspective view of a robot cleaner, according to an embodiment of the present disclosure.

FIG. 3 is a diagram illustrating a perspective view of a robot cleaner, according to an embodiment of the present disclosure.

Referring to FIG. 3, the robot cleaner 100, according to an embodiment of the present disclosure, may include a main body, a first capturing unit 153 configured to capture a region in front of the robot cleaner 100, and a sensor 151 configured to detect an obstacle in front of the robot cleaner. The sensor 151 may be embodied as one or more of a supersonic sensor, an infrared sensor, an RF sensor, and the like. The main body may be formed in a circular shape, and thus, the main body may have a certain rotation radius. Accordingly, the main body may avoid contact with the neighboring obstacles, and may easily perform a direction change. The circular shape may also prevent the main body from becoming stuck as a result of a neighboring obstacle while driving.

The display 120, which is configured to display status information of the robot cleaner, and the operation input unit 130, which is configured to receive an operation of the robot cleaner from the user, are disposed on a top surface of the robot cleaner 100.

When an object is detected through the first capturing unit 153 the driver 160 may reverse the main body of the robot cleaner so as to capture the region in which the corresponding object is located after the corresponding object is sucked, and the first capturing unit 153 may perform secondary capturing on the region in which the sucked object was located. The robot cleaner, according to an embodiment of the present disclosure, may capture images before and after object suction with respect to the region in which the object is located using a single capturing device, and thus, fabrication cost may be reduced.

In another embodiment of the present disclosure, the robot cleaner may be implemented in a form such that first capturing is performed on the object-located region, the main body is rotated 180 degrees to face the object-located region after the first capturing, and secondary capturing is performed on the region in which the object was located.

In another embodiment of the present disclosure, the capturing of the object may be performed in response to the object having a size greater than a preset size not being sucked.

Figure 4:
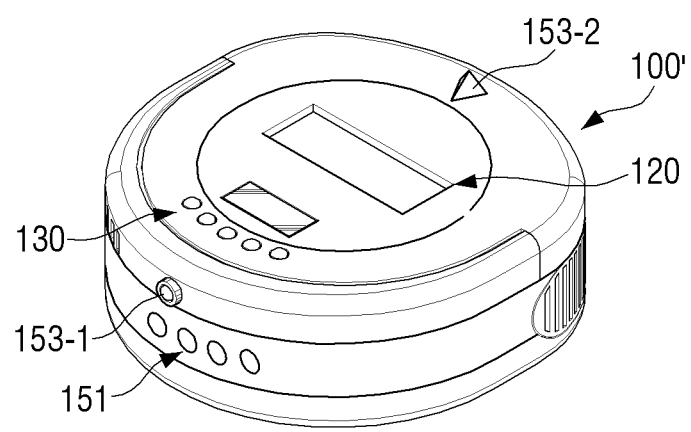
FIG. 4 is a diagram illustrating a perspective view of a robot cleaner, according to another embodiment of the present disclosure.

FIG. 4 is a diagram illustrating a perspective view of a robot cleaner, according to another embodiment present disclosure.

Referring to FIG. 4, a robot cleaner 100', according to another embodiment of the present disclosure, includes a main body, a first capturing unit 153-1 configured to capture a region in front of the robot cleaner, a second capturing unit 153-2 configured to capture a region behind the robot cleaner, and the sensor 151 configured to detect an obstacle in front of the robot cleaner.

Unlike the robot cleaner of FIG. 3, two capturing units 153-1 and 153-2 are provided. The robot cleaner may perform secondary capturing of the region in which a sucked object was located using the second capturing unit 153-2. The robot cleaner, according to an embodiment of the present disclosure, may capture images before and after object suction with respect to the region in which the object is located using two capturing devices, and thus, the time required for capturing the object before and after the object suction may be reduced.

The embodiments of FIGS. 3 and 4 have described configurations for detecting or capturing situations in front of and behind the robot cleaner 100. According to an embodiment of the present disclosure, the robot cleaner may further include a sensor (or capturing unit) configured to detect a position of a ceiling on a top surface of the robot cleaner 100.

Figure 5:
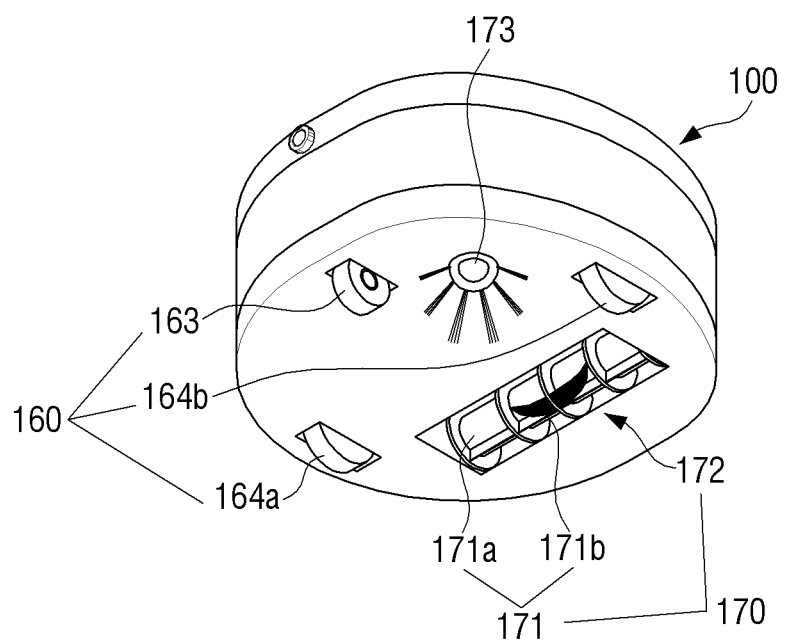
FIG. 5 is a diagram illustrating a bottom side of a robot cleaner, according to an embodiment of the present disclosure.

FIG. 5 is a diagram illustrating a bottom side of a robot cleaner, according to an embodiment of the present disclosure.

Referring to FIG. 5, the driver 160, which is configured to move the robot cleaner 100, and the suction unit 170, which is configured to suck dust, are disposed on a bottom side of the robot cleaner 100.

The driver 160 may cause the main body to drive in the cleaning region. The driver 160 includes left and right driving wheels 164a and 164b and a caster 163. The left and right driving wheels 164a and 164b may receive power from a driving motor. The left and right driving wheels 164a and 164b may be mounted on a central region of the bottom side of the main body, and the caster 163 may be mounted on a front region of the bottom of the main body so that the main body may maintain a stable posture.

Each of the left and right driving wheels 164a and 164b and the caster 163 may be configured in one assembly, and may be detachably mounted on the main body.

The suction unit 170 may remove dust on a floor on which the main body is laid. The suction unit 170 includes a side brush 173, a brush drum unit 172, and a dust container.

The side brush 173 is rotatably mounted on one side of an edge of the bottom side of the main body. The side brush 173 is biasedly mounted in a diagonal direction from the front of the main body.

The side brush 173 may move the dust collected around the main body to the floor on which the main body is laid. A cleaning range may extend to a region around the floor on which the main body is laid by the side brush 173. The side brush 173 may clean the dust collected in a corner that is a boundary between the floor and a wall.

The brush drum unit 172 is mounted in a position on the bottom side of the main body more biased toward a rear of the main body than the left and right driving wheels 164a and 164b, which are disposed in the central region of the bottom of the main body.

The brush drum unit 172 may clean dust collected on the floor on which the main body is laid. The brush drum unit 172 may be configured to include a dust inflow channel for forming a dust inflow channel. The brush drum unit 172 is configured to include a brush unit 171, which is provided in the dust inflow channel and configured to brush the dust on the floor. A dust sensor, which is configured to detect an amount of dust in the inflowing air, may be located on one side of the dust inflow channel.

The brush unit 171 includes a roller 171a and a brush 171b buried in an outer circumference of the roller 171a. The roller 171a may receive power from a driving motor, and the brush 171b may stir the dust collected on the floor. The roller 171a may be formed of a rigid body, but the material for the roller 171a is not limited thereto. The brush 171b may be formed of various materials having elasticity.

The brush unit 171 may be controlled with uniform velocity so as to uniformly maintain the cleaning performance. The rotation speed of the brush unit 171 may be lower when cleaning an unsmooth floor surface such as a carpet as compared to a smooth floor surface. The current and the like may be provided so that the rotation speed of the brush unit 171 may be uniformly maintained.

Figure 6:
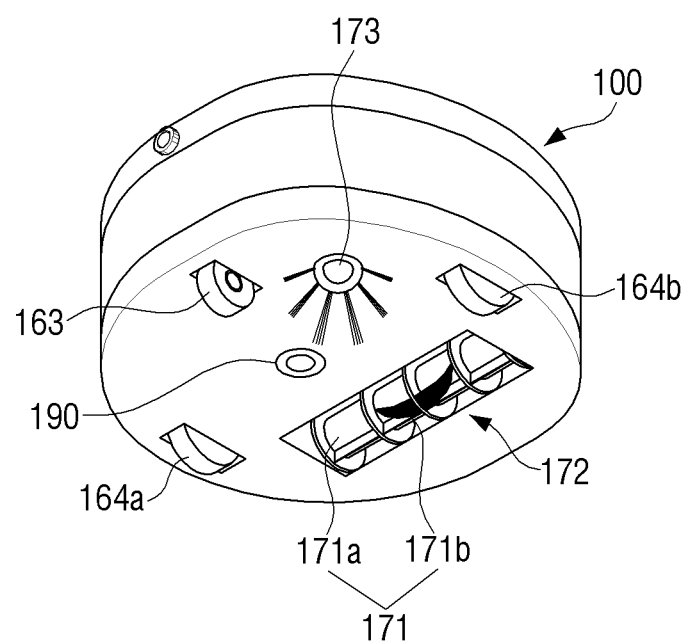
FIG. 6 is a diagram illustrating a bottom side of a robot cleaner, according to another embodiment of the present disclosure.

FIG. 6 is a diagram illustrating a bottom side of the robot cleaner, according to another embodiment of the present disclosure. The robot cleaner 100 further includes an air exhaust unit 190 disposed on the bottom side of the robot cleaner 100.

The air exhaust unit 190 may exhaust the air. For example, the air exhaust unit 190 may include an air bypass channel configured to indirectly exhaust the air, which is exhausted by the dust suction of the suction unit 170, to the floor surface, and may be configured to exhaust a portion of the air exhausted from the suction unit 170 to the floor surface when determining the cleaning state. Accordingly, the dust collected on the floor surface may be diffused into the air by the air exhausted from the air exhaust unit 190, and a portion of the dust diffused into the air may flow in the suction unit 170. The detector 150 may detect the degree of dust in the dust inflow channel, and the controller 180 may determine the cleaning state according to the detected degree of dust.

The embodiments of FIGS. 5 and 6 describe main bodies of the robot cleaners having a circular disc form, but the robot cleaners may be implemented in an elliptic shape or a polygonal shape.

The embodiments of FIGS. 5 and 6 have a dust container mounted in a rear side of the main body, and an inlet port of the dust container is in communication with the dust inflow channel of the brush drum unit 172. The dust swept through the brush unit 171 may be stored in the dust container through the dust inflow channel.

A dust sensor configured to detect dust included in the inflowing air may be disposed in the dust inflow channel. The dust sensor may be configured to include a light-emitter configured to emit a beam and a light-receiver configured to receive a beam. For example, the dust sensor may detect dust information according to an amount of light received in the light-receiver.

Figure 7:
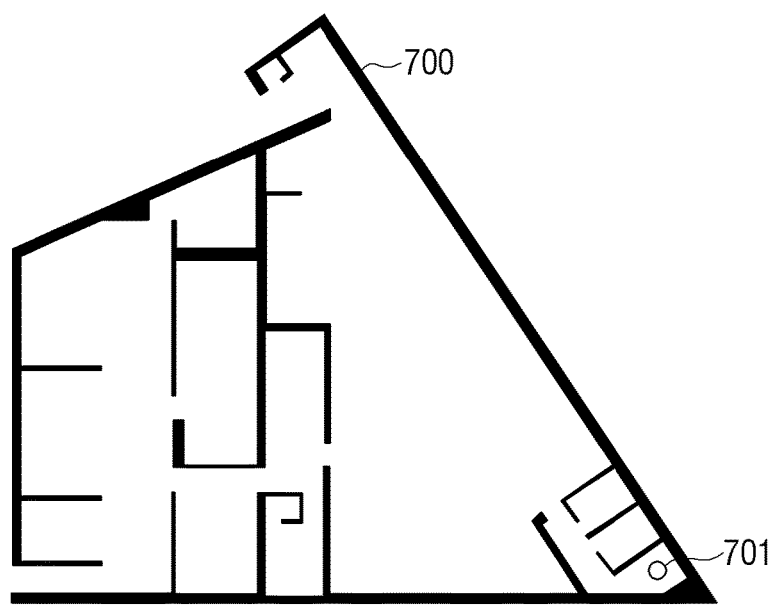
FIG. 7 is a diagram illustrating a cleaning map generated in a robot cleaner, according to an embodiment of the present disclosure.

FIG. 7 is a diagram illustrating a cleaning map generated from a robot cleaner, according to an embodiment of the present disclosure.

Referring to FIG. 7, a robot cleaner 701 may generate a cleaning map 700 using a sensor configured to detect a position of a ceiling. The robot cleaner 100 may supplement the generated cleaning map based on an image captured through the capturing unit during movement for the cleaning and obstacle information detected through an obstacle detection sensor. The cleaning map may be generated only the first time, or may be generated every cleaning. The generated cleaning map may be used to describe the cleaning schedule or to indicate a non-cleaning region and an object suction place.

Figure 8:
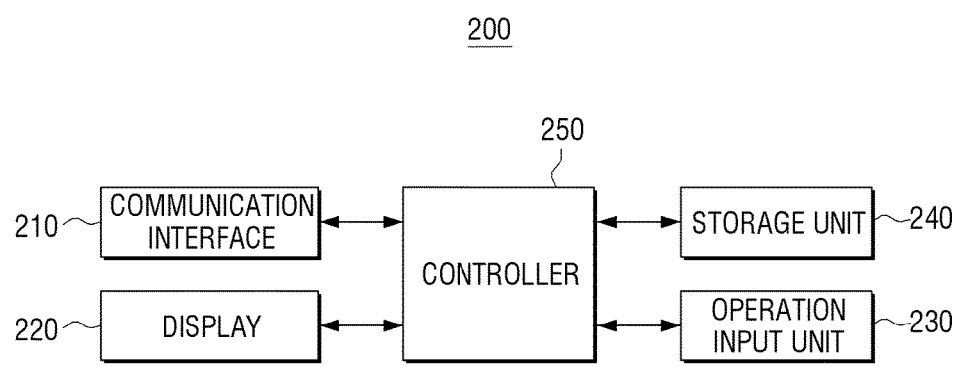
FIG. 8 is a block diagram illustrating a configuration of a terminal apparatus of FIG. 1, according to an embodiment of the present disclosure.

FIG. 8 is a block diagram illustrating a configuration of a terminal apparatus of FIG. 1, according to an embodiment of the present disclosure.

Referring to FIG. 8, the terminal apparatus 200 includes a communication interface 210, a display 220, an operation input unit 230, a storage unit 240, and a controller 250. The terminal apparatus 200 may be embodied as a smart phone, a laptop computer, a portable multimedia player (PMP), an MP3 player, a smart television (TV), a wearable device (for example, smart watch), and the like.

The communication interface 210 may be configured to couple the terminal apparatus 200 to an external apparatus (for example, the robot cleaner and an Internet network). For example, the communication interface 210 may be connected to the external apparatus through a local area network (LAN) and the Internet network. In another example, the communication interface 210 may be connected to the external apparatus through a wireless communication method (for example, Z-wave, 4-low power wireless personal area network (4LoWPAN), radio frequency identification (RFID), long term evolution device to device (LTE D2D), Bluetooth low energy (BLE), general packet radio service (GPRS), Weightless, Edge Zigbee, ANT+, near field communication (NFC), infrared data association (IrDA), digital enhanced cordless telecommunications (DECT), wireless LAN (WLAN), Bluetooth, WiFi, WiFi Direct, GSM, UMTS, LTE, WiBRO, and the like).

The communication unit 210 may receive schedule information. For example, the communication interface 210 may receive user schedule information from a server in which a user account is presented. In response to a plurality of user accounts being presented, the communication interface 210 may receive pieces of schedule information, according to the accounts from a plurality of servers corresponding to the plurality of user accounts.

The communication interface 210 may receive cleaning result information. For example, the communication interface 210 may receive the cleaning result information from the robot cleaner 100 when cleaning is completed. The cleaning result information may include map information generated in the robot cleaner, moving path information of the robot cleaner in the map, an image of the sucked object, a type of the sucked object, position information of the sucked object, non-cleaning region information, and the like.

The communication interface 210 may receive error information. For example, in response to the robot cleaner 100 being in contact with water, the cleaning operation of the robot cleaner 100 may be stopped, and the robot cleaner 100 may remain in a corresponding place. In response to the error state being generated, the communication interface 210 may receive error information informing that the robot cleaner 100 is in contact with liquid.

The display 220 may display a variety of information supported by the terminal apparatus 200. The display 220 may be a monitor such as a LCD or a cathode-ray tube (CRT). The display may be implemented with a touch screen capable of simultaneously performing a function of the operation input unit 230.

The display 220 may display the received cleaning schedule information and cleaning result information. For example, the display 220 may display the cleaning schedule information of the robot cleaner according to a user's selection. In this example, the display 220 may display the cleaning map previously generated in the robot cleaner 100 and information for an expected moving path of the robot cleaner. The display 220 may display information for a cleaning starting time, a cleaning duration, and the like.

The display 220 may display the cleaning result information received through the communication interface 210. The display 220 may display images before and after cleaning. For example, the display 220 may display the cleaning duration, and an error occurrence state. In this example, in response to a history for object suction being present or a non-cleaning region being present, the display 220 may also display the images captured for the corresponding region. Accordingly, the user may easily check the cleaning operation of the robot cleaner 100, the object sucked through the robot cleaner 100, and a non-cleaning region. The user may take appropriate action for the non-cleaning region, and the user may input a re-cleaning command for the non-cleaning region to the robot cleaner 100 through the operation input unit 230.

In response to error information, notifying of driving interruption due to contact with the liquid, being received during driving of the robot cleaner, the display 220 may display information informing that the cleaning for the driver of the robot cleaner is necessary. Various user interface windows to be displayed through the display 220 are described in greater detail below with reference to FIGS. 9 to 16.

The operation input unit 230 may include a plurality of function keys, which the user may set, or through which the user may select various types of functions supported by the terminal apparatus 200. For example, the operation input unit 230 may be implemented with a device such as a mouse or a keyboard. In another example, the operation input unit 230 may be implemented with a touch screen capable of simultaneously performing a function of the display 220.

The operation input unit 230 may receive a user schedule. The operation input unit 230 may receive a cleaning schedule of the robot cleaner from the user. The operation input unit 230 may receive a control command for a driving state of the robot cleaner 100. For example, the operation input unit 230 may receive a command, which allows the robot cleaner 100 to perform a cleaning operation when the cleaning schedule is preset. The operation input unit 230 may receive a cleaning command for all regions on the cleaning map or receive a cleaning command for a specific region.

The operation input unit 230 may receive a re-cleaning command for the non-cleaning region, according to a first cleaning result report.

The storage unit 240 may store a variety of programs and data required for operation of the terminal apparatus 200. The storage unit 240 may be implemented with a nonvolatile memory, a volatile memory, a flash memory, a HDD, a SSD, or the like. The storage unit 240 may be accessed by the controller 250, and read/record/correct/delete/update of data in the storage unit 240 may be performed by the controller 250. The term "storage unit" in this embodiment, may include the storage unit 240, a read only memory (ROM) or a random access memory (RAM) in the controller 250, a memory card (for example, micro security digital (SD) card, a memory stick, and the like) mounted on the terminal apparatus 200, and the like.

For example, programs, data, and the like, for constituting various screens to be displayed in a user interface window may be stored in the storage unit 240. The storage unit 240 may store programs that are a set of various commands required for driving of the terminal apparatus 200. The programs may include an application (or application program) for providing specific service as well as an operating program for driving the application.

The storage unit 240 may store the user schedule information preset by the user or the user schedule information received from an external server through the communication interface 210. The storage unit 240 may store the cleaning schedule generated in the controller 250 and may store the cleaning result information received through the communication interface 210.

The controller 250 may control the configuration components in the terminal apparatus 200. For example, the controller 250 may control an overall operation of the terminal apparatus 200 using a variety of programs stored in the storage unit 240. For example, the controller 250 may include a central processing unit (CPU), a RAM, a ROM, a system bus, and the like. The ROM may be configured to store a set of commands for system booting, and the CPU may copy an operating system (OS) stored in the storage unit 240 to the RAM according to the command stored in the ROM, and boot up the system by executing the OS. In response to the booting being completed, the CPU may copy various applications stored in the storage unit 240 to RAM, and perform various operations by executing the applications. In another embodiment of the present disclosure, the controller 250 may be implemented with a plurality of CPUs (or digital signal processing (DSP), system on chips (SoCs), and the like).

In response to the terminal apparatus 200 being booted, the controller 250 may control an application for control of the robot cleaner or generation of the cleaning schedule to be driven, and control the display 220 to display the user interface window according to the corresponding application driving. The controller 250 may generate the cleaning schedule of the robot cleaner according to the control command received from the user, and control the communication interface 210 to perform the operation according to the generated cleaning schedule. The controller 250 may control the display 220 to display the cleaning result of the robot cleaner.

The terminal apparatus 200, according to an embodiment of the present disclosure, may change or generate the cleaning plan of the robot cleaner according to user schedule information, and may provide a cleaning service adaptive to the user. The terminal apparatus 200, according to the an embodiment of the present disclosure, may provide the cleaning schedule and cleaning result of the robot cleaner 100 to the user, and thus, the user may easily check the cleaning result, the region in which the cleaning is not performed, and the like.

FIGS. 9 to 16 are diagrams illustrating user interface windows to be displayed in the display of the terminal apparatus, according to an embodiment of the present disclosure.

Figure 9:
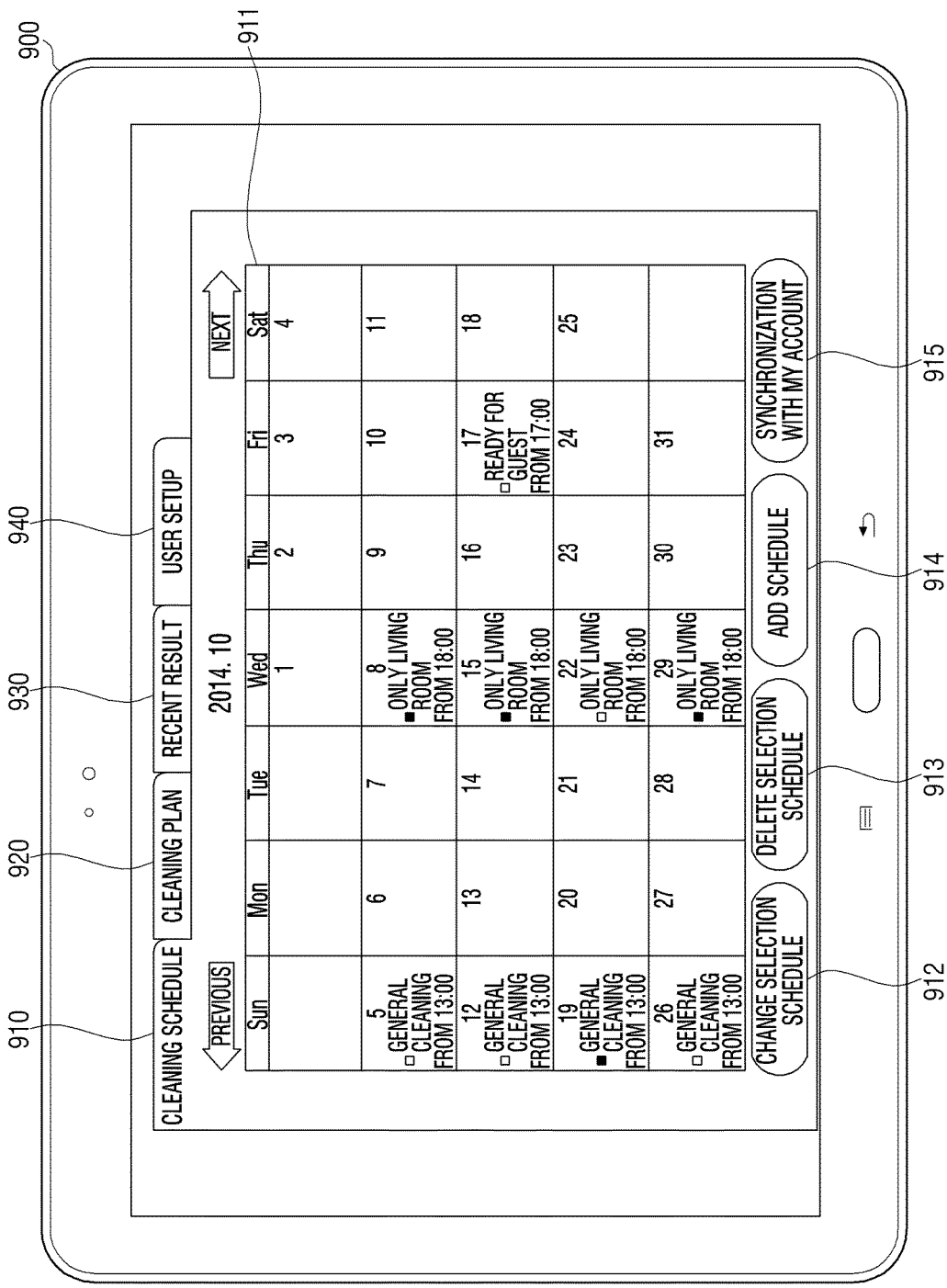
FIGS. 9 to 16 are diagrams illustrating user interface windows to be displayed at the terminal apparatus, according to an embodiment of the present disclosure.

FIG. 9 illustrates a user interface window that displays a cleaning schedule of a robot cleaner.

Referring to FIG. 9, a user interface window 900 includes regions for items 910, 920, 930, and 940 provided from applications, a schedule display region 911, and regions for schedule adjustment items 912, 913, 914, and 915.

Figure 10:
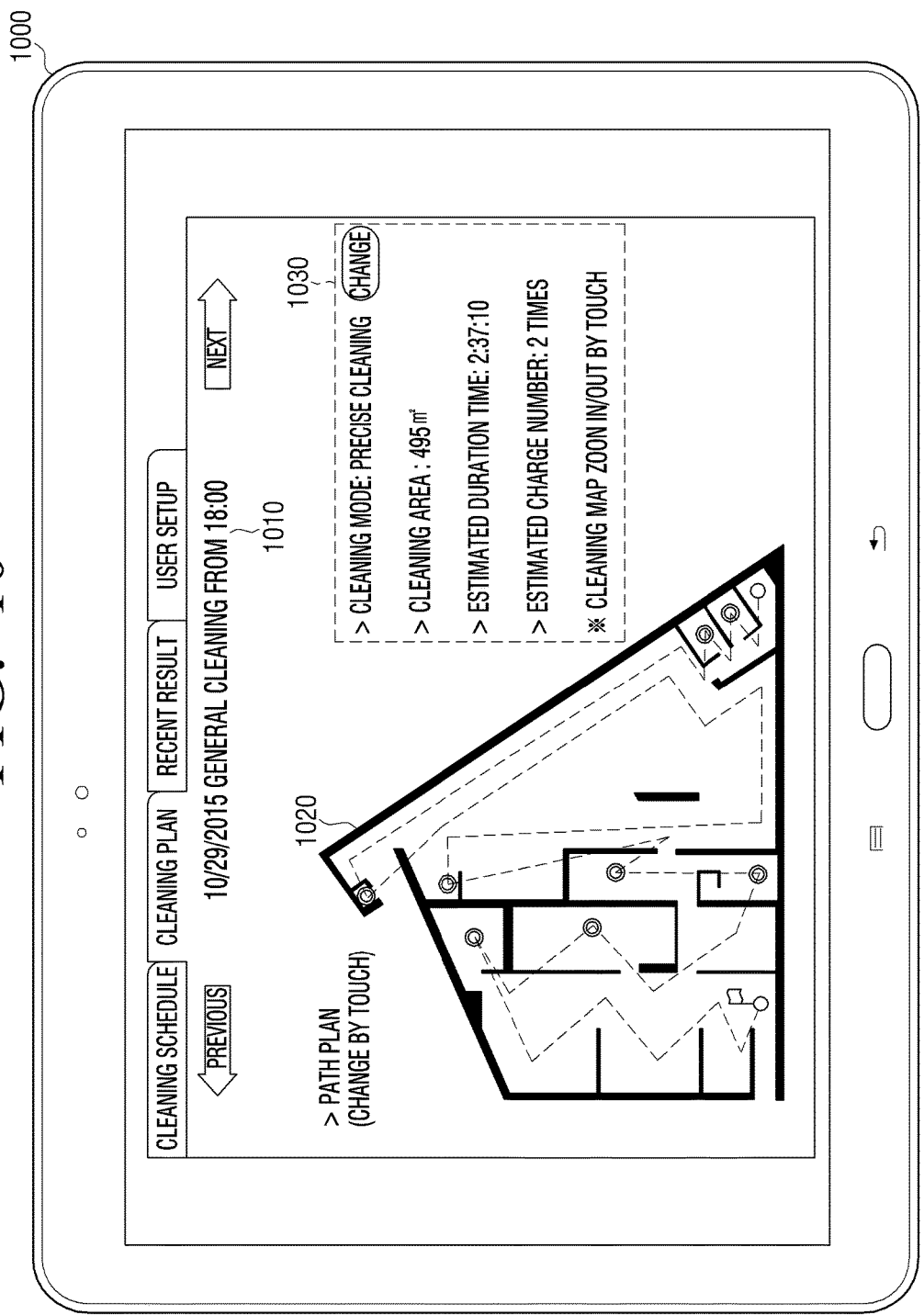
Figure 11:
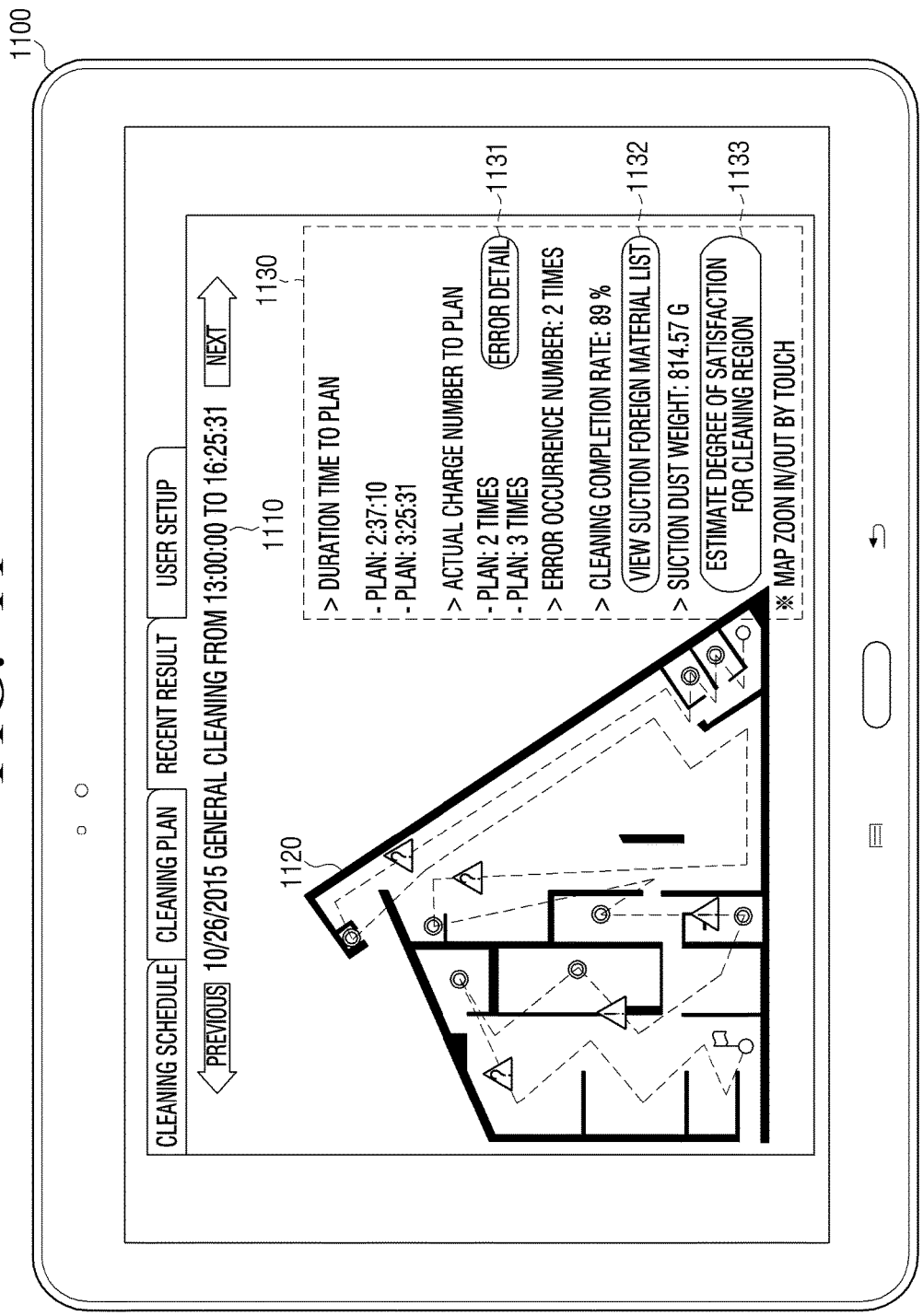
Figure 14:
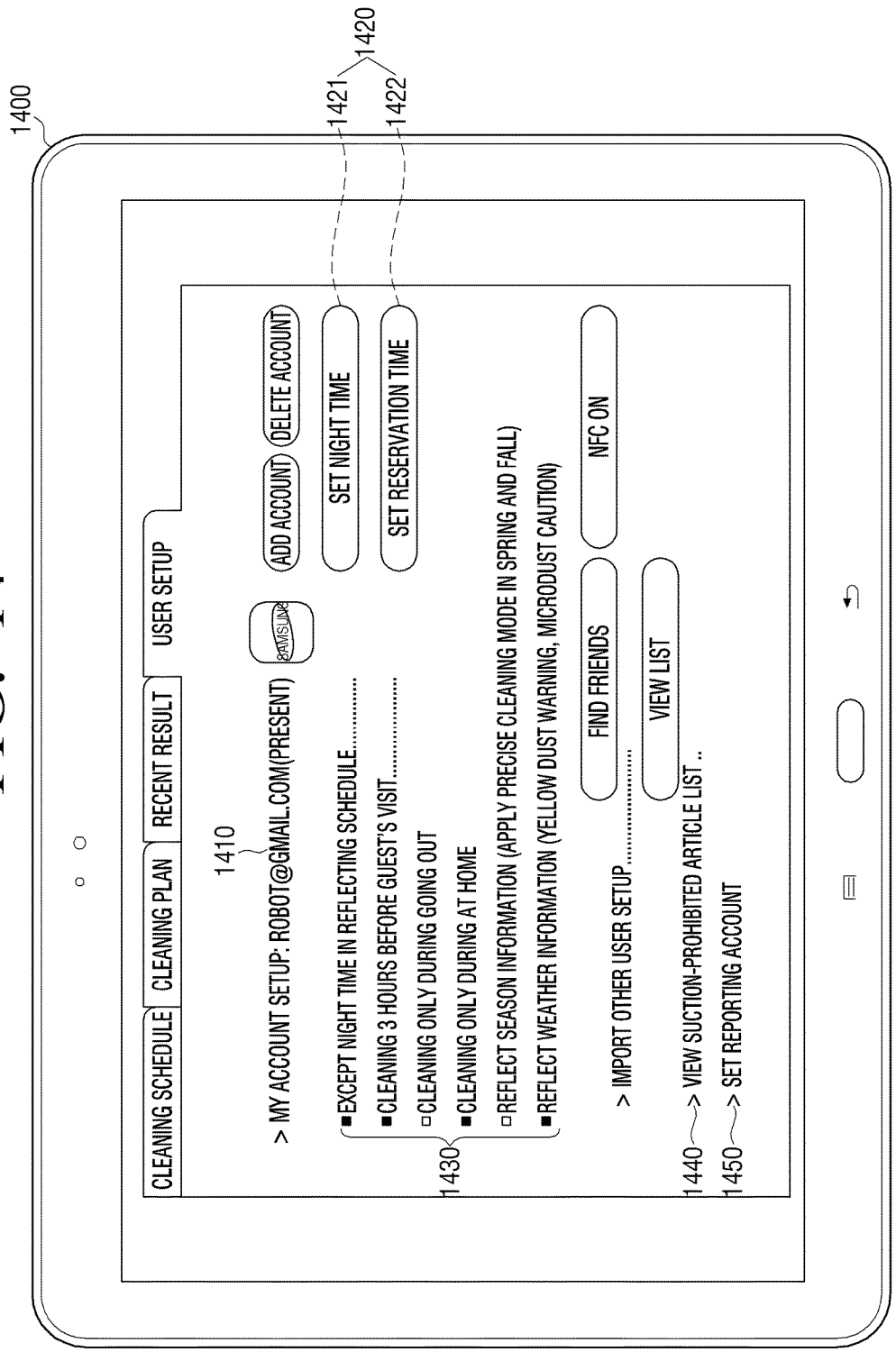

The regions for items 910 to 940 indicate items provided from cleaning applications, and the user interface window 900 illustrated in FIG. 9 is displayed in response to the item 910 for the cleaning schedule being selected. In response to the item 920 being selected by the user, a user interface window as illustrated in FIG. 10 may be displayed. In response to the item 930 being selected by the user, a user interface window as illustrated in FIG. 11 may be displayed, and in response to the item 940 being selected by the user, a user interface window as illustrated in FIG. 14 may be displayed.

The cleaning schedules of the robot cleaner 100 may be displayed in a calendar form in the schedule display region 911. In response to any one of the illustrated cleaning schedules being selected, the user interface window as illustrated in FIG. 10, which indicates a cleaning plan according to a corresponding schedule, may be displayed.

FIG. 9 displays expected cleaning schedules together with a calendar on a monthly basis, but the user interface window may be implemented to display cleaning schedules together with a calendar on a weekly basis. In another example, the user interface window may be implemented to display only the cleaning schedules without a calendar. In the example illustrated in FIG. 9, the cleaning schedules on Wednesday and Sunday may be periodic cleaning schedules, which are set default by the user, and the cleaning schedule on October 17 may be a cleaning schedule generated as an event according to the user schedule.

The schedule adjustment items 912 to 915 may be used to add or change cleaning schedules presented in the schedule display region 911. For example, the user may change a date or time of the previously selected cleaning schedule by selecting any one of the cleaning schedules displayed in the schedule display region 911, and by selecting the item 912 for selected schedule change.

The user may cancel the previously selected cleaning schedule through the item 913 for selected schedule deletion.

The user may generate a new cleaning schedule, which is not presented in the schedule display region 911, through the item 914 for schedule addition.

In response to the item 915, for synchronization with an account selected by the user, the terminal apparatus 200 may acquire user schedule information through the user account, detect an event in which cleaning is necessary from the acquired schedule information, and generate or change the cleaning schedule according to the detected event. For example, in response to a personal schedule, that is, a guest's visit on October 25 at 17:00, the terminal apparatus may detect the event in which the cleaning schedule is necessary on October 25 from the acquired personal schedule through the keyword "guest's visit", and generate a cleaning schedule on October 25 at 14:00 so that the cleaning is completed before the guest's visit at 17:00.

FIG. 10 is a diagram illustrating an example of a user interface, which indicates a cleaning plan of a robot cleaner.

Referring to FIG. 10, a user interface window 1000 includes a display region 1010 for cleaning schedule time information, a region 1020 for path information, and a region 1030 for an estimated operation.

The display region 1010 for cleaning schedule time information may display time information of a pre-generated cleaning schedule.

The region 1020 for path information may display a cleaning map previously generated in the robot cleaner 100, and an estimated moving path of the robot cleaner 100 on the corresponding cleaning map according to the cleaning schedule.

The region 1030 for estimated operation information may display information for a cleaning mode, an estimated cleaning duration time, and the like, when the corresponding schedule is performed. The operation of calculating the displayed estimated cleaning duration time is described in greater detail below with reference to FIG. 18.

FIG. 11 is a diagram illustrating an example of a user interface window, which indicates a recent result of a robot cleaner.

Referring to FIG. 11, a user interface window 1100 includes a display region 1110 for a cleaning duration time, a region 1120 for path information, and a region 1130 for cleaning result information.

The display region 1110 for a cleaning duration time may display a cleaning duration time performed in the robot cleaner.

Figure 12:
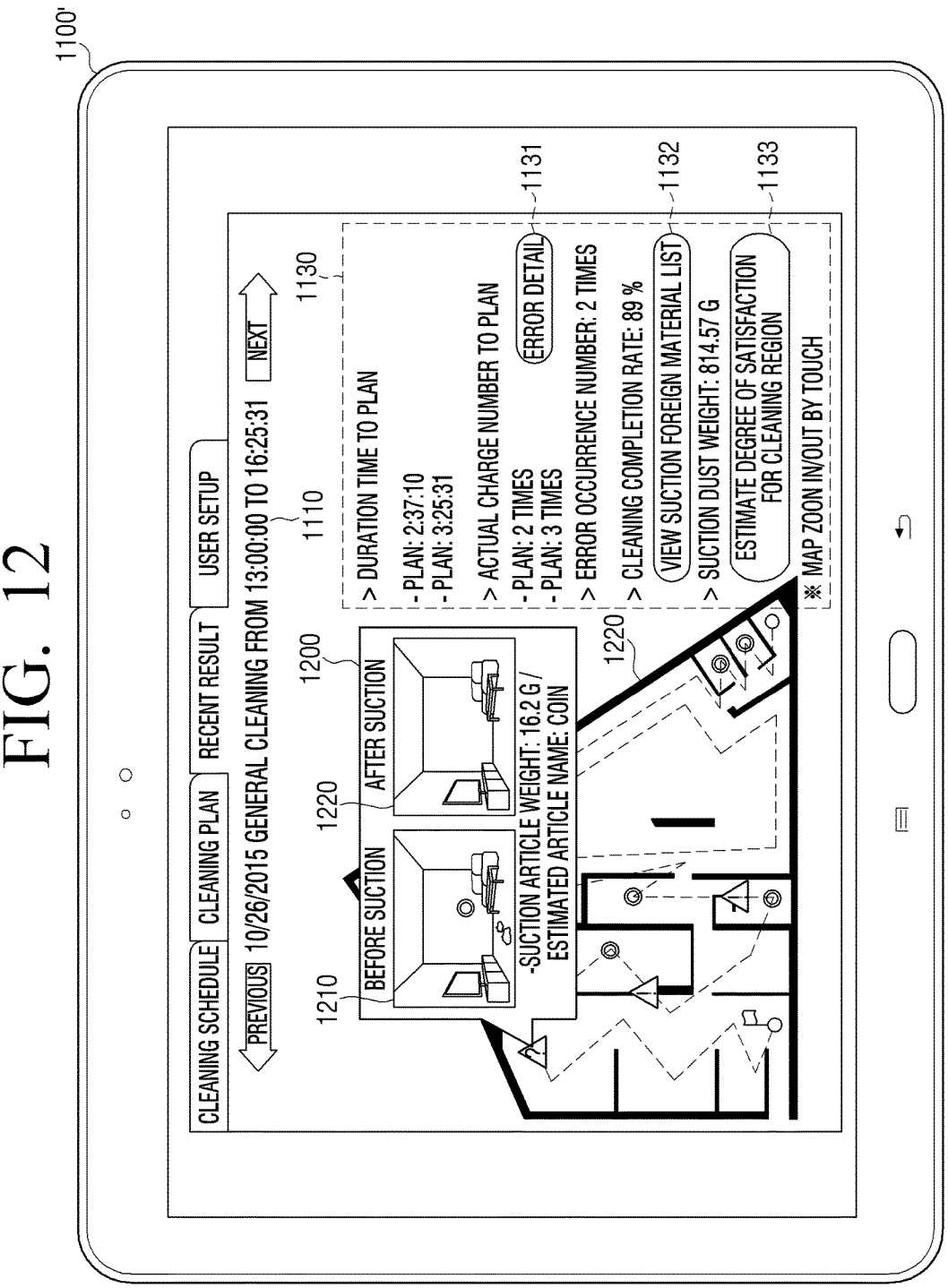
Figure 13:
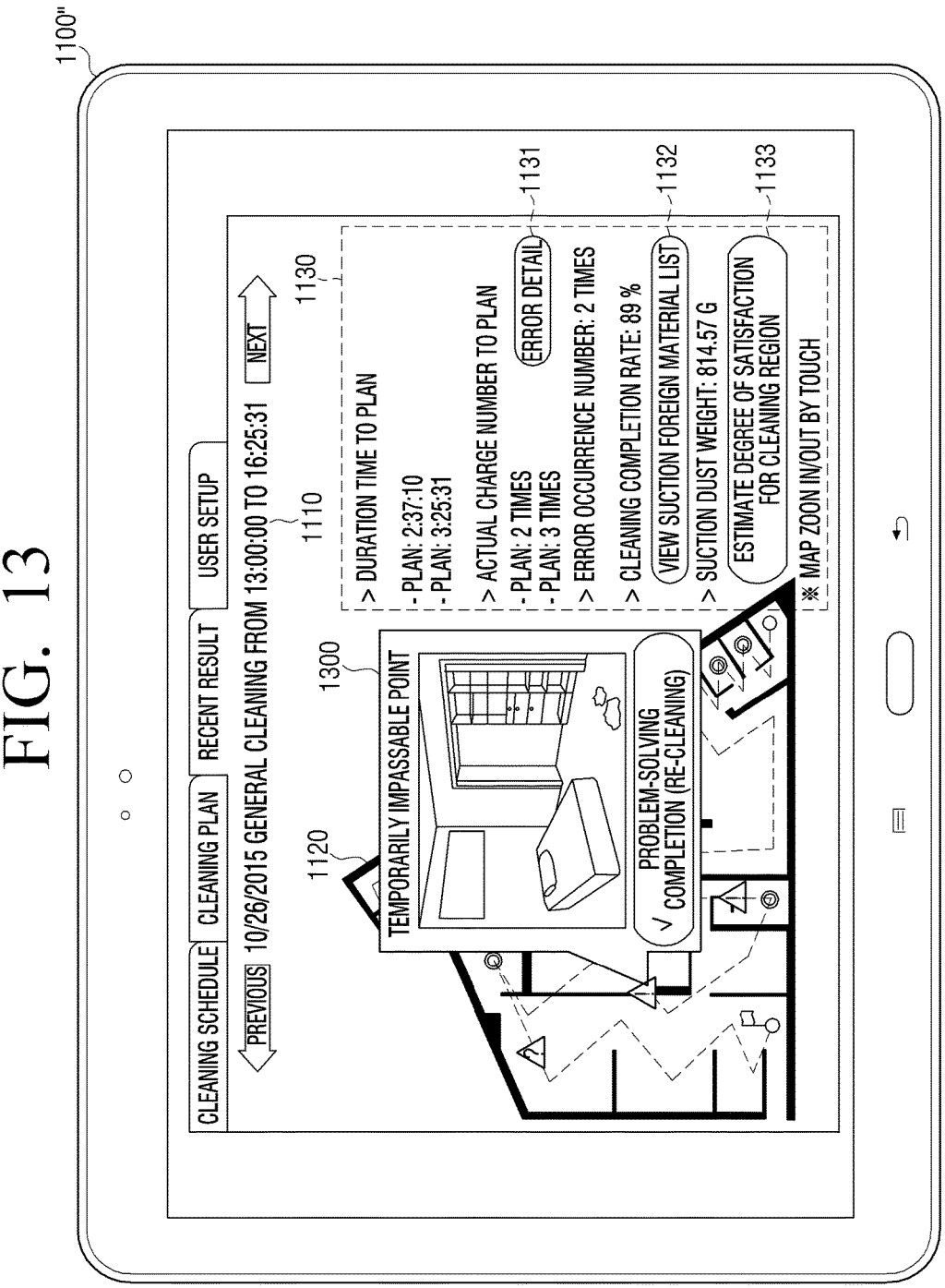

The region 1120 for path information may display a cleaning map previously generated in the robot cleaner 100 and a moving path of the robot cleaner 100 during a corresponding cleaning process. The region 1120 for path information may display a position (? icon) of an object sucked in the cleaning process and a position (! icon) of a non-cleaning region together with the cleaning map and the moving path. In response to the "?" icon being selected on the map by the user, a user interface window may be displayed as illustrated in FIG. 12. In response to the "!" icon being selected on the map by the user, a user interface window may be displayed as illustrated in FIG. 13.

The region 1130 for cleaning result information may be a region that comparatively displays information before actual cleaning and information after the actual cleaning. As illustrated in FIG. 11, the information displayed in the region 1130 for cleaning result information may include a planned time, an actual duration time, an estimated charge number, an actual charge number, a cleaning completion rate, an object suction number, a selection region for degree of user satisfaction, and the like. In another embodiment of the present disclosure, the user interface window may be implemented to display images before and after cleaning together with the text information. A plurality of images may be displayed, and the plurality of images may be determined according to various conditions.

When an item 1131 for error detail is selected by the user, the robot cleaner 100 may collectively display captured images for regions in which the cleaning was not performed during the cleaning process.

When an item 1132 for a suction foreign material list view is selected by the user, the robot cleaner 100 may display images for foreign materials sucked in the cleaning process in a list form.

FIG. 12 is a diagram illustrating an example of a user interface window 1100' to be displayed in response to the "?" icon being selected in FIG. 11.

Referring to FIG. 12, the user interface window 1100' includes the display region 1110 for a cleaning duration time, the region 1120 for path information, the region 1130 for cleaning result information, and a suction object image display region 1200.

The suction object image display region 1200 is a user interface window that is displayed in response to the "?" icon being selected in the region 1120 for path information, and simultaneously displays an image captured before suction and an image captured after suction in response to an object being sucked by the robot cleaner. Accordingly, the user may easily determine whether or not the robot cleaner sucks an important object. The user may accurately determine whether or not the corresponding object is actually sucked up by the robot cleaner through the displayed pictures before and after the suction.

In response to the object being detected, the robot cleaner, according to an embodiment of the present disclosure, may not perform cleaning on a region in which the corresponding object is presented until the user checks the corresponding object, but preferentially performs the cleaning on the region in which the corresponding object is presented and posteriorly allows the user to check the sucked object. Accordingly, the cleaning time of the robot cleaner may be reduced.

As illustrated in FIG. 12, the suction object image display region 1200 may provide the image of the sucked object and may simultaneously provide information for an estimated object by grasping the kind of the corresponding object, and thus, the user may more easily determine whether or not the sucked object is an important object.

FIG. 13 is a diagram illustrating an example of a user interface window 1100" to be displayed in response to the "!" icon being selected in FIG. 11.

Referring to FIG. 13, the user interface window 1100" includes the display region 1110 for a cleaning duration time, the region 1120 for path information, the region 1130 for cleaning result information, and a non-cleaning information display region 1300.

The non-cleaning information display region 1300 displays information for a region in which the robot cleaner has not performed cleaning since it was bypassed in response to detecting an object to be an unsuckable size or a suction-prohibited object. The user may determine which region is not cleaned through the non-cleaning information display region 1200, and may input a re-cleaning command for the corresponding region after the user changes the corresponding region to a cleanable region.

FIG. 14 is a diagram illustrating an example of a user interface window for setup of a robot cleaner.

Referring to FIG. 14, a user interface window 1400 includes a user account information region 1410, a schedule setup region 1420, a cleaning mode region 1430, a suction object setup region 1440, and a reporting account setup region 1450.

The user account information region 1410 receives user account information used to generate cleaning schedule or displays pre-input user account information. FIG. 14 has illustrated only one piece of account information, but a plurality of accounts may be used for a user having a plurality of accounts.

The schedule setup region 1420 receives conditions in response to the cleaning schedule being generated. The schedule setup region 1420 includes a region 1421 in which a time, during which no cleaning has to be performed, is set, and a region 1422 in which a cleaning time start point is set in response to a specific even being presented.

The cleaning mode region 1430 receives information required to generate the cleaning schedule or receives information for cleaning mode generation in a corresponding schedule.

The suction object setup region 1440 receives a setup of whether or not to perform suction for a specific object. In response to the suction object setup region 1440 being selected by the user, a user interface window as illustrated in FIG. 15 may be displayed.

The reporting account setup region 1450 receives a setup for accounts of the other terminal apparatuses to which an error generated in the robot cleaner or a cleaning result of the robot cleaner 100 is received other than the terminal apparatus 200, or setup for a user account. When a phone number is previously registered by the user through the reporting account setup region 1450, the terminal apparatus may notify the user of information regarding an error or cleaning completion through a short message service (SMS) message, a multimedia message service (MMS) message, and the like. When a mail account or a social network service (SNS) account is registered by the user, the terminal apparatus 200 may notify the user of the information for the error or the cleaning completion through the corresponding account.

The notification through the account information received through the reporting account setup region 1450 may be generally performed in the terminal apparatus 200, but it may be implemented in a form that the account information may be transmitted to the robot cleaner 100, and the robot cleaner 100 may directly inform the user of the information regarding an error or cleaning completion.

Figure 15:
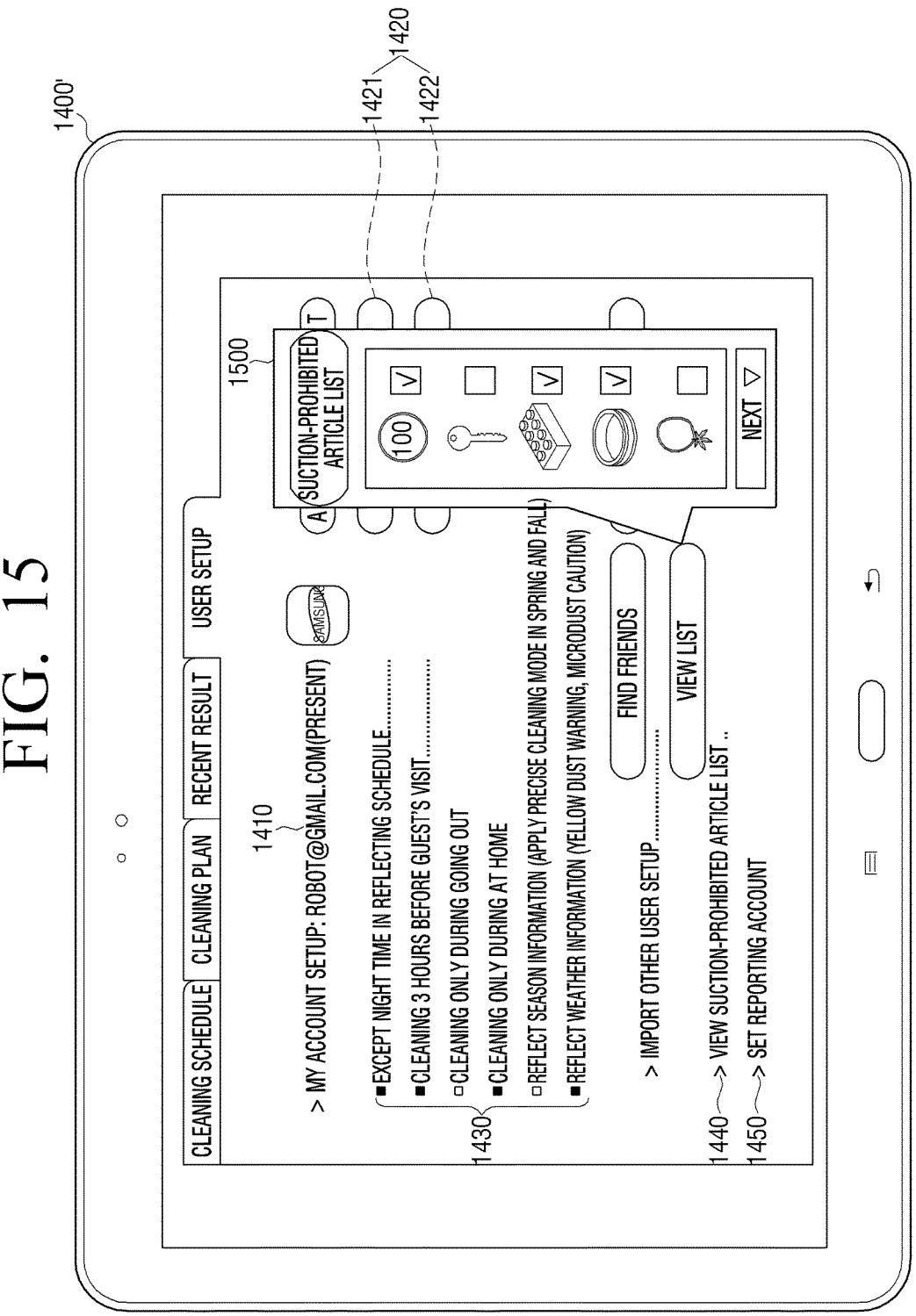

FIG. 15 is a diagram illustrating a user interface window 1400' to be displayed in response to the suction object setup region being selected in FIG. 14.

Referring to FIG. 15, the user interface window 1400' includes the user account information region 1410, the schedule setup region 1420, the cleaning mode region 1430, the suction object setup region 1440, and a suction-prohibited object selection region 1500.

The suction-prohibited object selection region 1500 displays various objects that are detectable by the robot cleaner. The user may select suction-prohibited objects from among the displayed objects. For example, the user may set a coin, a block, and a ring as the suction-prohibited objects. When an object is detected during the cleaning, the robot cleaner 100 may determine whether the corresponding object is the coin, the block, or ring. When the corresponding object is any one of the coin, the block, and the ring, the robot cleaner 100 does not suck the corresponding object, and bypasses the corresponding object. Thus, the robot cleaner 100 may continuously perform the cleaning operation. When the corresponding object is not any one of the coin, the block, and the ring, the robot cleaner 100 sucks up the corresponding object and continues to perform the cleaning operation.

Figure 16:
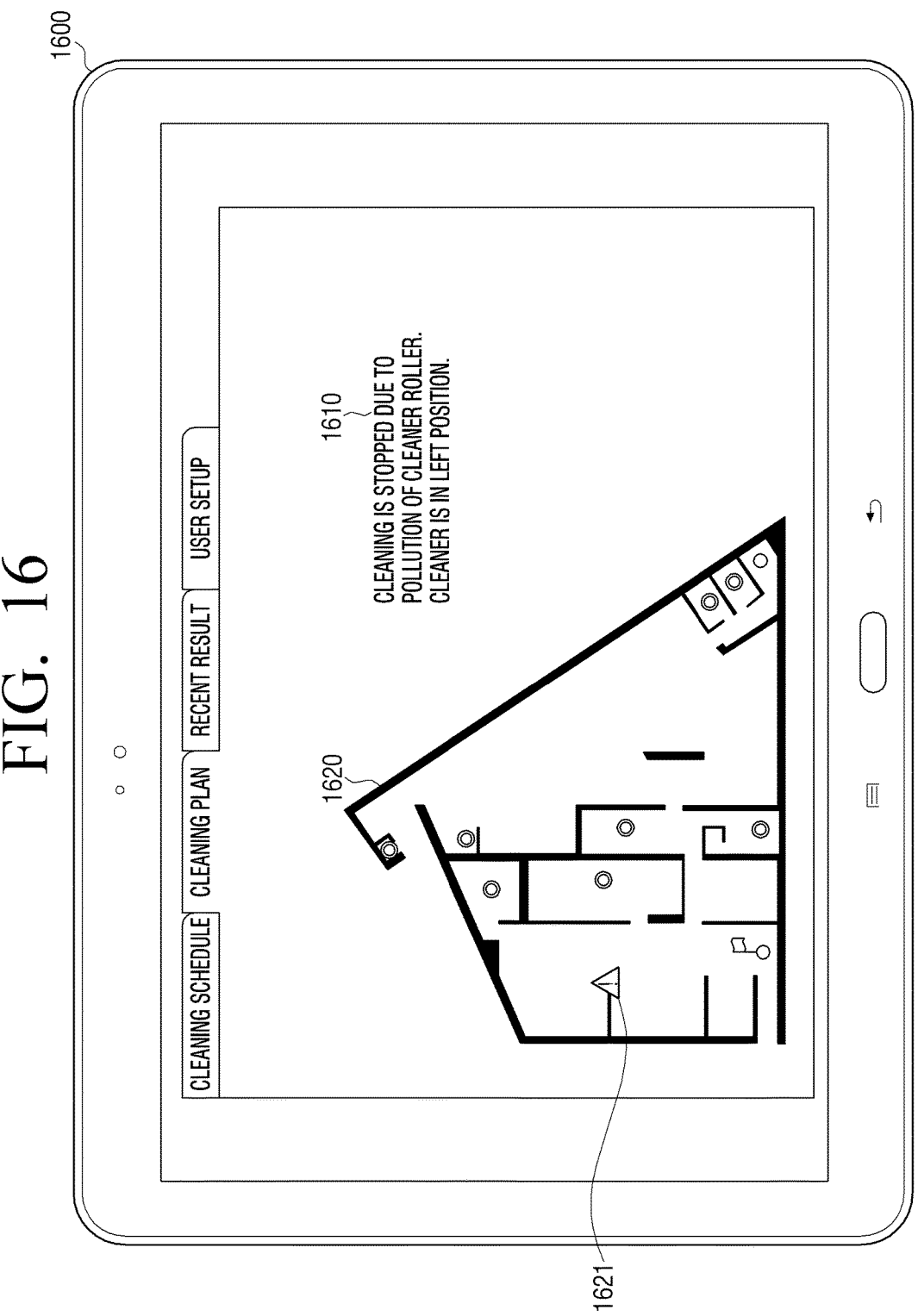

FIG. 16 is a diagram illustrating a user interface window 1600 to be displayed in response to generation of an error autonomously insolvable in the robot cleaner.

Referring to FIG. 16, the user interface window 1600 includes an error information display region 1610 and a robot cleaner position display region 1620.

The error information display region 1610 displays a message notifying that the driving of the robot cleaner is stopped in response to the robot cleaner being in contact with liquid.

The robot cleaner position display region 1620 displays current position information 1621 of the robot cleaner together with a map.

The user may easily grasp the error type of the robot cleaner and the region in which the robot cleaner is located through the information displayed in the display regions 1610 and 1620.

Figure 17:
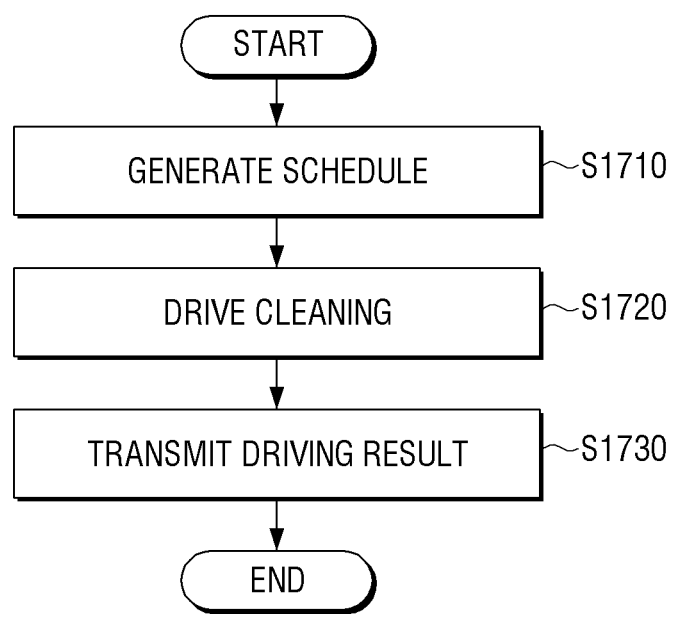
FIG. 17 is a flowchart illustrating a controlling method of a robot controller, according to an embodiment of the present disclosure.

FIG. 17 is a flowchart illustrating a controlling method of a robot cleaner, according to an embodiment of the present disclosure.

Referring to FIG. 17, the robot cleaner generates a cleaning schedule, in step S1710. For example, the robot cleaner may receive user schedule information from a terminal apparatus or a server, and generate the cleaning schedule according to the received user schedule information. A detailed cleaning schedule generation operation is described in greater detail below with reference to FIGS. 18 to 20.

In response to a cleaning event being generated according to the generated schedule, the robot cleaner performs a cleaning operation, in step S1720. The cleaning operation of the robot cleaner is described in greater detail below with reference to FIGS. 22 to 26.

In response to the cleaning operation being completed, the robot cleaner generates cleaning result information, and transmits the generated cleaning result information to the terminal apparatus, in step S1730. The cleaning result information may include images for allowing the user to easily grasp states before and after the cleaning. The cleaning result information may further include map information generated in the robot cleaner, moving path information of the robot cleaner, an image of the sucked object, a kind of the sucked object, position information of the sucked object, non-cleaning region information, and the like.

The controlling method of the robot cleaner may change or generate the cleaning schedule of the robot cleaner according to the user schedule information, and thus, may provide a cleaning service adaptive to the user's life. The controlling method of the robot cleaner may provide the cleaning plan and cleaning result to the user, and thus, the user may easily confirm the cleaning result, a non-cleaning region, and the like. For example, the controlling method illustrated in FIG. 17 may be executed in the robot cleaner having the configuration of FIG. 2. In another example, the controlling method illustrated in FIG. 17 may be executed in robot cleaners having other configurations.

The controlling method as described above may be implemented with a program including an algorithm executable in a computer, and the program may be stored in a non-transitory computer readable medium, and provided.

The non-transitory computer-recordable medium is not a medium configured to temporarily store data such as a register, a cache, or a memory, but an apparatus-readable medium configured to permanently or semi-permanently store data. For example, the above-described various applications or programs may be stored in the non-transitory apparatus-readable medium, such as, for example, a compact disc (CD), a digital versatile disc (DVD), a hard disc, a Blu-ray disc, a universal serial bus (USB), a memory card, or a ROM, and provided.

Figure 18:
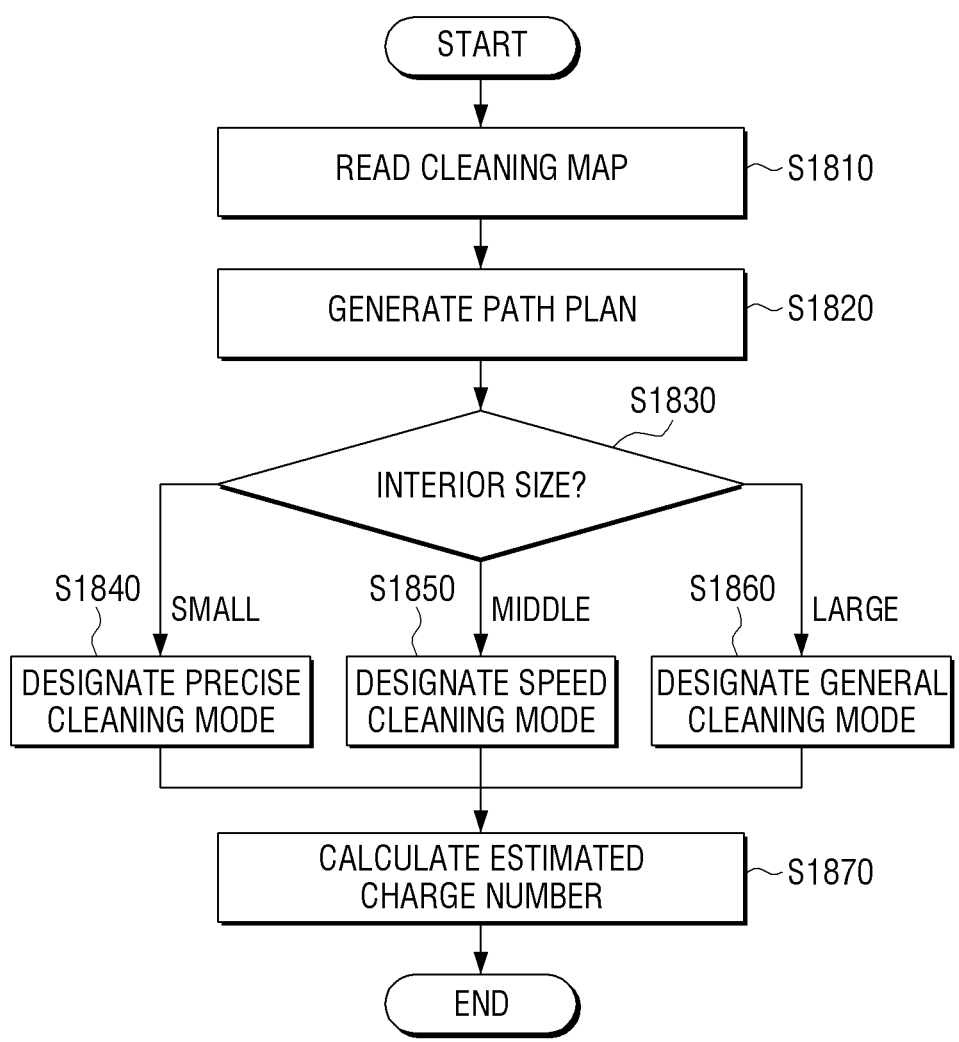
FIGS. 18 to 20 are flowcharts illustrating an operation of generating a schedule of FIG. 17, according to an embodiment of the present disclosure.
Figure 19:
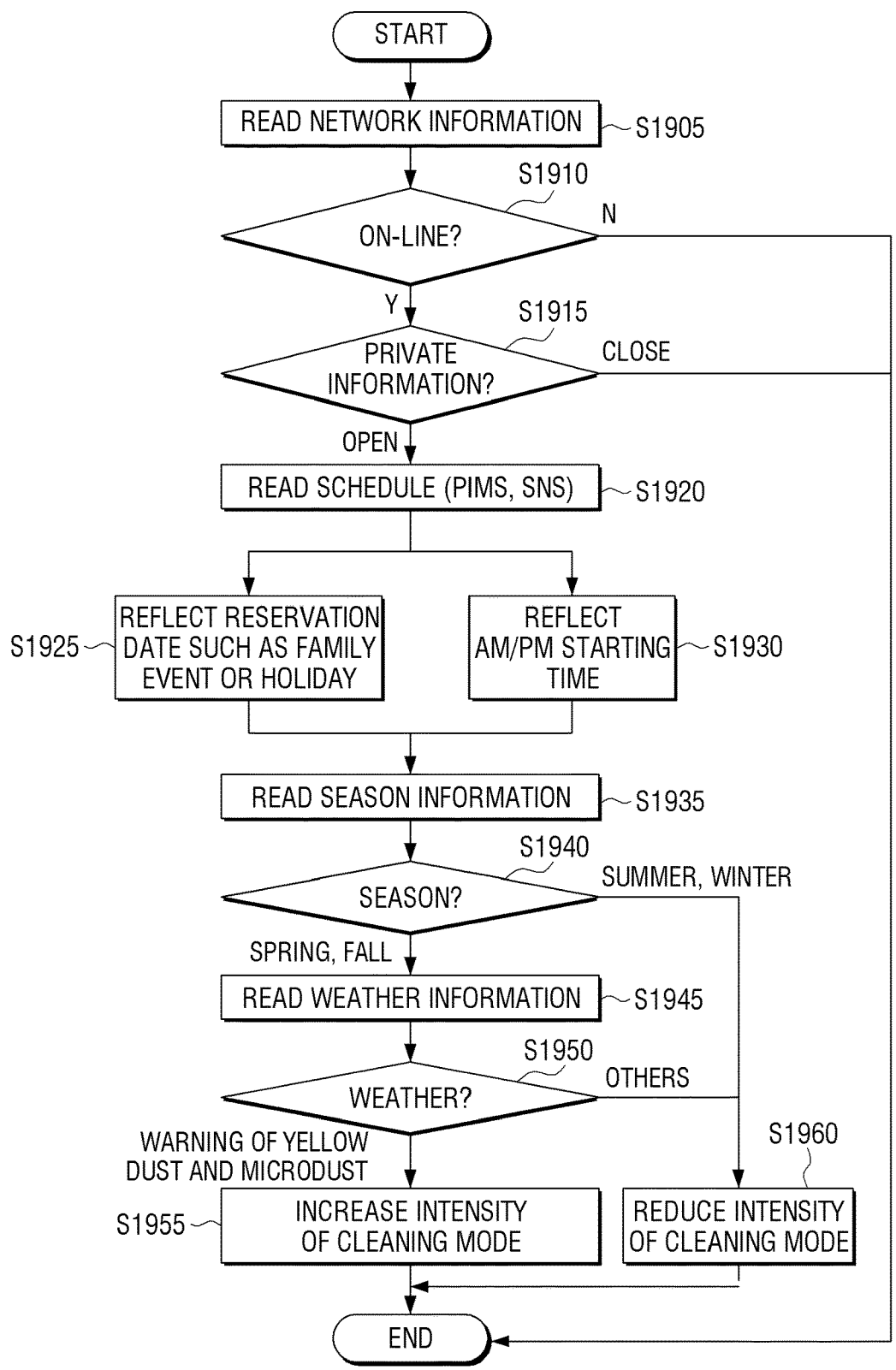
Figure 20:
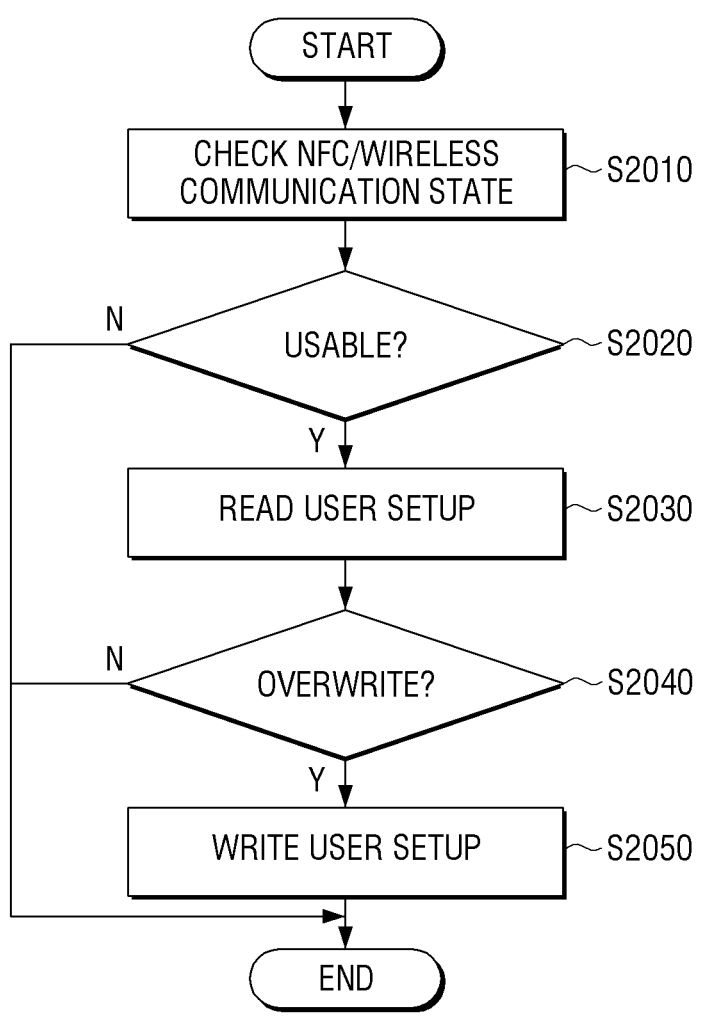

FIGS. 18 to 20 are flowcharts illustrating an operation of generating the schedule of FIG. 17, according to an embodiment of the present disclosure.

FIG. 18 is a flowchart illustrating a process of generating estimated operation information according to the generated schedule.

Referring to FIG. 18, the robot cleaner reads out a pre-stored cleaning map, in step S1810810).

The robot cleaner generates a cleaning path according to the read cleaning map, in step S1820.

The robot cleaner determines an interior size through a cleaning region in the cleaning map, in step S1830. The robot cleaner sets a cleaning mode according to the determined interior size. The cleaning mode may be divided according to the interior size so as to perform the cleaning operation within a fixed time. Accordingly, the operations of determining the interior size and determining the cleaning mode according to the determination result may be omitted without limitations on the cleaning time.

When it is determined that the interior size is small, the robot cleaner designates a precise cleaning mode in step S1840. When it is determined that the interior size is large, the robot cleaner designates a general cleaning mode, in step S1860. When it is determined that the interior size is between small and large (middle), the robot cleaner designates a speed cleaning mode in step S1850.

The robot cleaner calculates an estimated charge number according to the determined interior size and the cleaning mode, in step S1870. For example, the robot cleaner may calculate an estimated cleaning time according to the determined interior size and the cleaning mode, and may calculate the estimated charge number according to the cleaning time.

Information for the cleaning path, the cleaning mode, and the charging number generated through the above-described operations may be reflected to a user interface window and may be displayed in the user interface window, as illustrated in FIG. 10.

FIG. 19 is a flowchart illustrating a method of generating a cleaning schedule according to user schedule information.

Referring to FIG. 19, the robot cleaner reads network information of the terminal apparatus 200, in step S1905. The robot cleaner determines a network state of the terminal apparatus 200 according to the network information, in step S1910.

When it is determined that the network state of the terminal apparatus 200 is in an off state, the robot cleaner terminates the cleaning schedule generation operation.

When it is determined that the network state of the terminal apparatus 200 is in an on state, the robot cleaner determines whether or not to open private information, in step S1915. When it is determined that the opening of the private information is prohibited (CLOSE), the robot cleaner terminates the cleaning schedule generation operation.

When it is determined that the opening of the private information is not prohibited (OPEN), the robot cleaner reads out user schedule information through a personal schedule server or an SNS server in which the user schedule information is stored, in step S1920.

The robot cleaner sets a basic cleaning time zone based on the read schedule, in step S1930, and the robot cleaner additionally sets the cleaning schedule, which is not periodic but sporadic, according to information for a family event, a holiday, and the like, in step S1925.

The robot cleaner reads season information, in step S1935, and determines the season, in step S1940. When the season is summer or winder, the intensity of the cleaning mode is reduced, in step S1960. When the season is spring or fall, the robot cleaner reads weather information, in step S1945. When there is not warning of microdust (yellow dust) in the weather information, the intensity of the cleaning mode is reduced, in step S1960. When there is a warning of microdust (yellow dust), the intensity of the cleaning mode is increased, in step S1955.

In another embodiment of the present disclosure, the cleaning schedule is generated in the robot cleaner 100. The robot cleaner 100 may acquire user information through an NFC contact with the terminal apparatus 200, and generate the cleaning schedule by reflecting the acquired user information, as described in greater detail with reference to FIG. 20.

FIG. 20 is a flowchart illustrating an operation of generating a cleaning schedule by acquiring information of the terminal apparatus 200 in the robot cleaner.

Referring to FIG. 20, the robot cleaner determines a wireless communication state of the robot cleaner, in step S2010. For example, the robot cleaner 100 may determine whether or not to directly acquire information of the terminal apparatus 200.

In step S2020, it is determined whether the robot cleaner is connectable to the terminal apparatus. When the robot cleaner is not connectable to the terminal apparatus 200, the operation of generating a cleaning schedule is terminated.

When the robot cleaner is connectable to the terminal apparatus 200, the robot cleaner reads out the user setup information set in the terminal apparatus, in step S2030. The robot cleaner determines whether or not the read user setup information is overwritable to the robot cleaner, in step S2040. When the read user setup information is not overwritable to the robot cleaner, the operation of generating a cleaning schedule is terminated. When the read user setup information is overwritable to the robot cleaner, the robot cleaner overwrites the read user setup information to the robot cleaner, in step S2050, and generates the cleaning schedule thereof based on the overwritten user setup information therein through the operation illustrated in FIG. 19.

Figure 21:
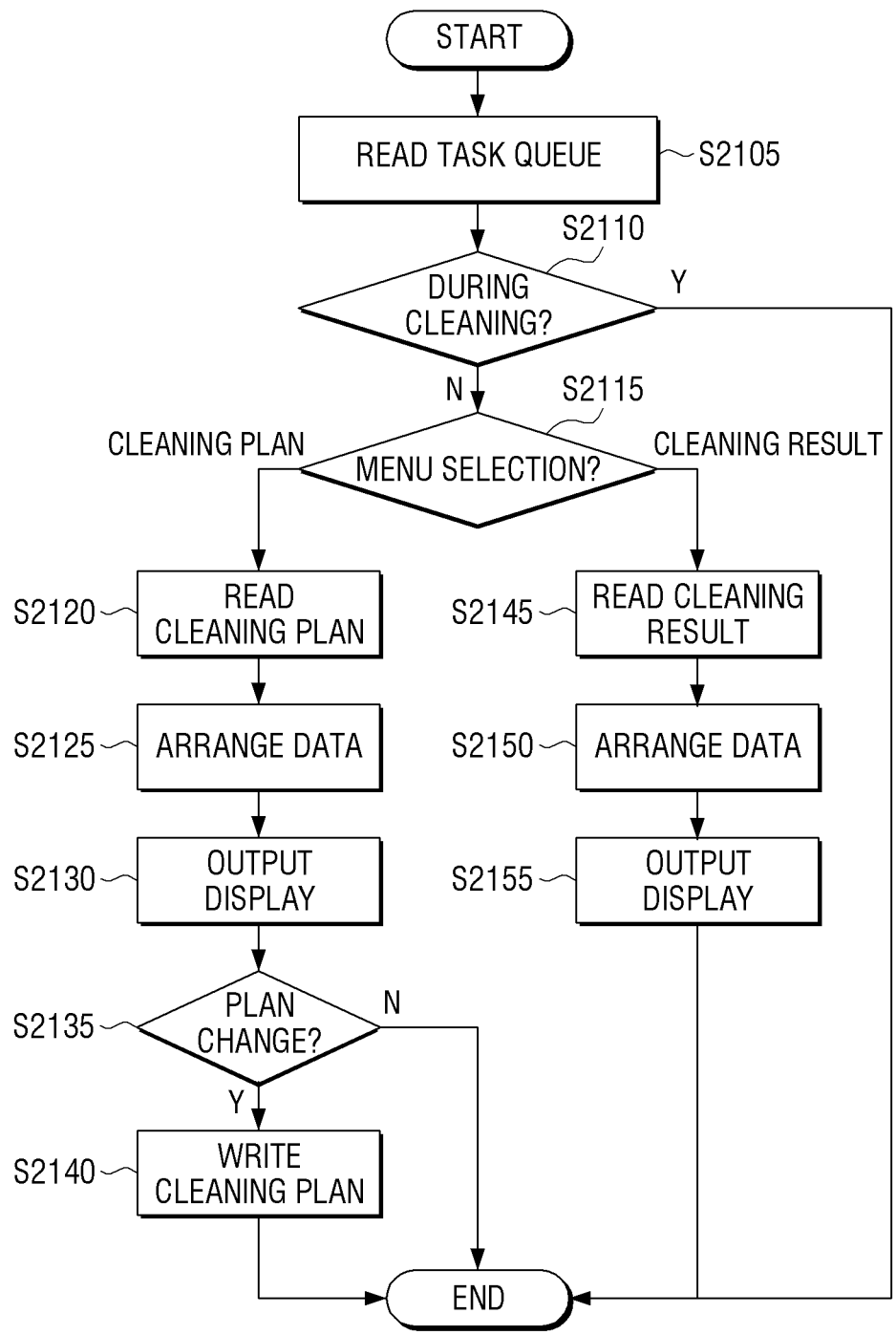
FIG. 21 is a flowchart illustrating a method of providing cleaning plan information and cleaning result information, according to an embodiment of the present disclosure.

FIG. 21 is a flowchart illustrating a method of providing cleaning plan information and cleaning result information.

Referring to FIG. 21, the robot cleaner reads a task queue, in step S2105.

The robot cleaner determines whether or not cleaning is being performed, in step S2110.

When the cleaning operation of the robot cleaner is performed, the operation of providing the information is terminated.

When the cleaning operation of the robot cleaner is not performed, the robot cleaner determines a menu selected by the user, in step S2115.

When the menu selected by the user is a cleaning plan, the robot cleaner reads a pre-stored cleaning plan, in step S2120, arranges the read cleaning plan, in step S2125, and display the cleaning plan, in step S2130.

In step S2135, it is determined whether a command for changing the plan is received. When a correction command for the displayed cleaning plan is received from the user, the user corrects the cleaning plan, in step S2140. When a correction command is not received, the operation of providing the information is terminated.

When the menu selected by the user is a cleaning result, the robot cleaner loads data for a pre-performed cleaning, in step S2145, arranges the loaded data, in step S2150, and displays the arranged data, in step S2155.

In another embodiment of the present disclosure, the menu selection and display operation of FIG. 21 may be performed in t the terminal apparatus 200. Other than operations S2130 and S2155, operations of transmitting the arranged data in operations S2125 and S2150 to the terminal apparatus may be performed so that the display output may be performed in the terminal apparatus 200.

FIGS. 22 to 26 are flowcharts illustrating a detailed operation of the cleaning driving of FIG. 17, according to an embodiment of the present disclosure.

Figure 22:
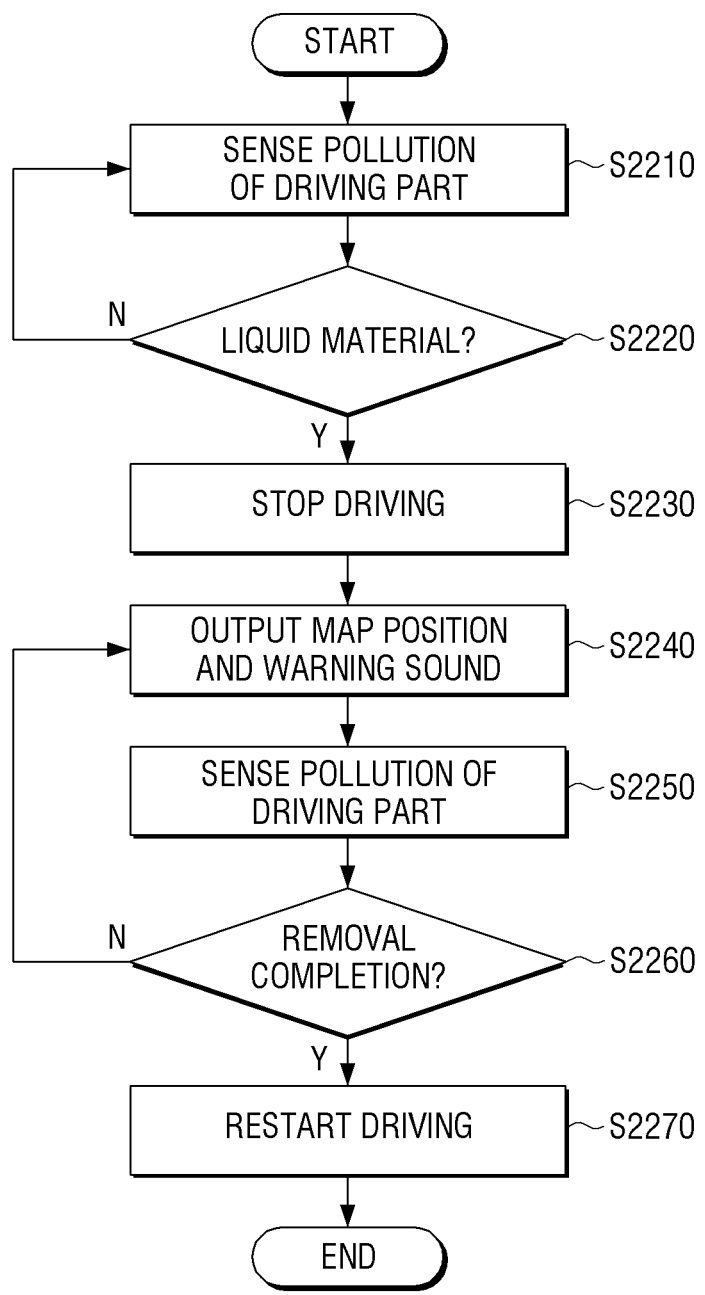
FIGS. 22 to 26 are flowcharts illustrating an operation of driving cleaning of FIG. 17, according to an embodiment of the present disclosure.

FIG. 22 is a flowchart illustrating a driving operation in response to a liquid material being detected.

Referring to FIG. 22, the robot cleaner detects pollution of a driving part (for example, a wheel), in step S2210.

In response to the pollution being detected, the robot cleaner determines whether or not the driving part is polluted by liquid, in step S2220.

In response to the pollution being determined as the liquid pollution, the robot cleaner 100 stops the driving thereof, in step S2230.

The robot cleaner 100 outputs a warning sound, and provides position information thereof to the terminal apparatus 200, in step S2240.

In step S2250, the robot cleaner senses the pollution of the driving part. In step S2260, the robot cleaner determines whether the pollution of the driving part is removed. When it is determined that the pollution is not removed, the methodology returns to step S2240. Thus, the robot cleaner continuously determines whether or not the pollution of the driving part is removed.

When it is determined that the pollution is removed, the robot cleaner restarts the driving, in step S2270.

Figure 23:
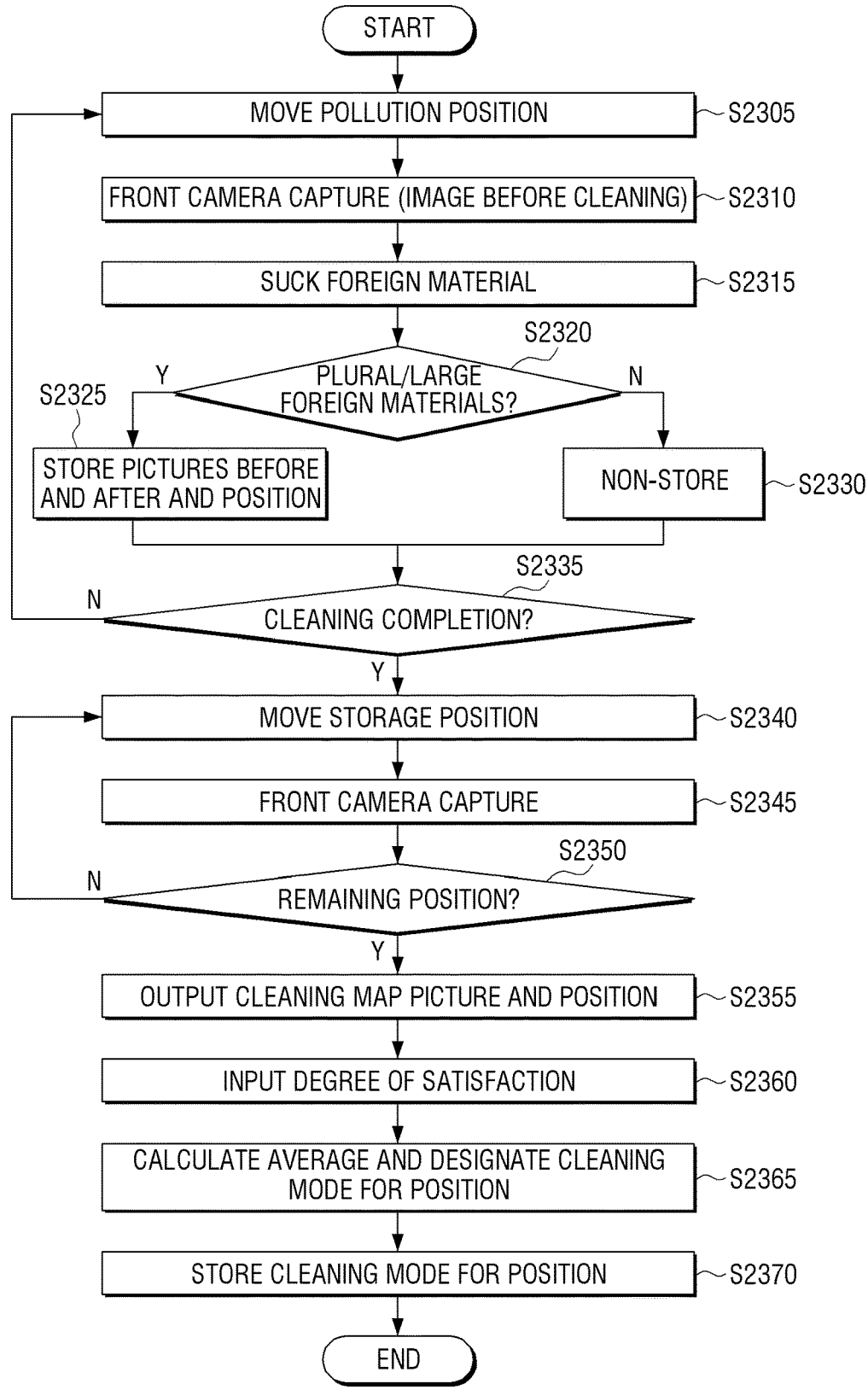

FIG. 23 is a diagram illustrating an operation of detecting an object in response to one capturing unit being used.

Referring to FIG. 23, the robot cleaner detects an object in front of the robot cleaner during cleaning driving, in step S2305.

The robot cleaner captures the object detected in front thereof, in step S2310.

The robot cleaner sucks up the corresponding material, in step S2315. In step S2320, it is determined whether a size of the sucked object is less than or equal to a preset size. When the size of the sucked object is less than or equal to a preset size, that is, in response to a size of the sucked object being an unidenticable small size, the robot cleaner does not store the captured image, in step S2330.

When a size of the sucked object is greater than the preset size, i.e., a larger object, the robot cleaner stores the captured image and corresponding position information, in step S2325.

In step S2335, it is determined whether cleaning is completed. When it is determined that cleaning is not completed, the methodology returns to step S2305. When it is determined that cleaning is completed, the robot cleaner moves to a pre-stored region, in step S2340, and performs secondary capturing on the region in which the sucked object was disposed, in step S2345. In step S2350, it is determined whether the secondary capturing is completed. When the secondary capturing is not completed, the methodology returns to step S2340. When the capturing operation is completed, the robot cleaner simultaneously provides the cleaning map and a position of the region in which the sucked object was disposed to the user, in step S2355.

In step S2360, a degree of satisfaction is input. In step S2365, an average is calculated and a cleaning mode is designated for the position. In step S2370, the cleaning mode is stored for the position. Thus, the robot cleaner may generate cleaning result information for the corresponding cleaning schedule.

According to an embodiment of the present disclosure, the robot cleaner may be driven in reverse after the suction of the object, and may perform the secondary capturing from a position in which the first capturing is performed.

Figure 24:
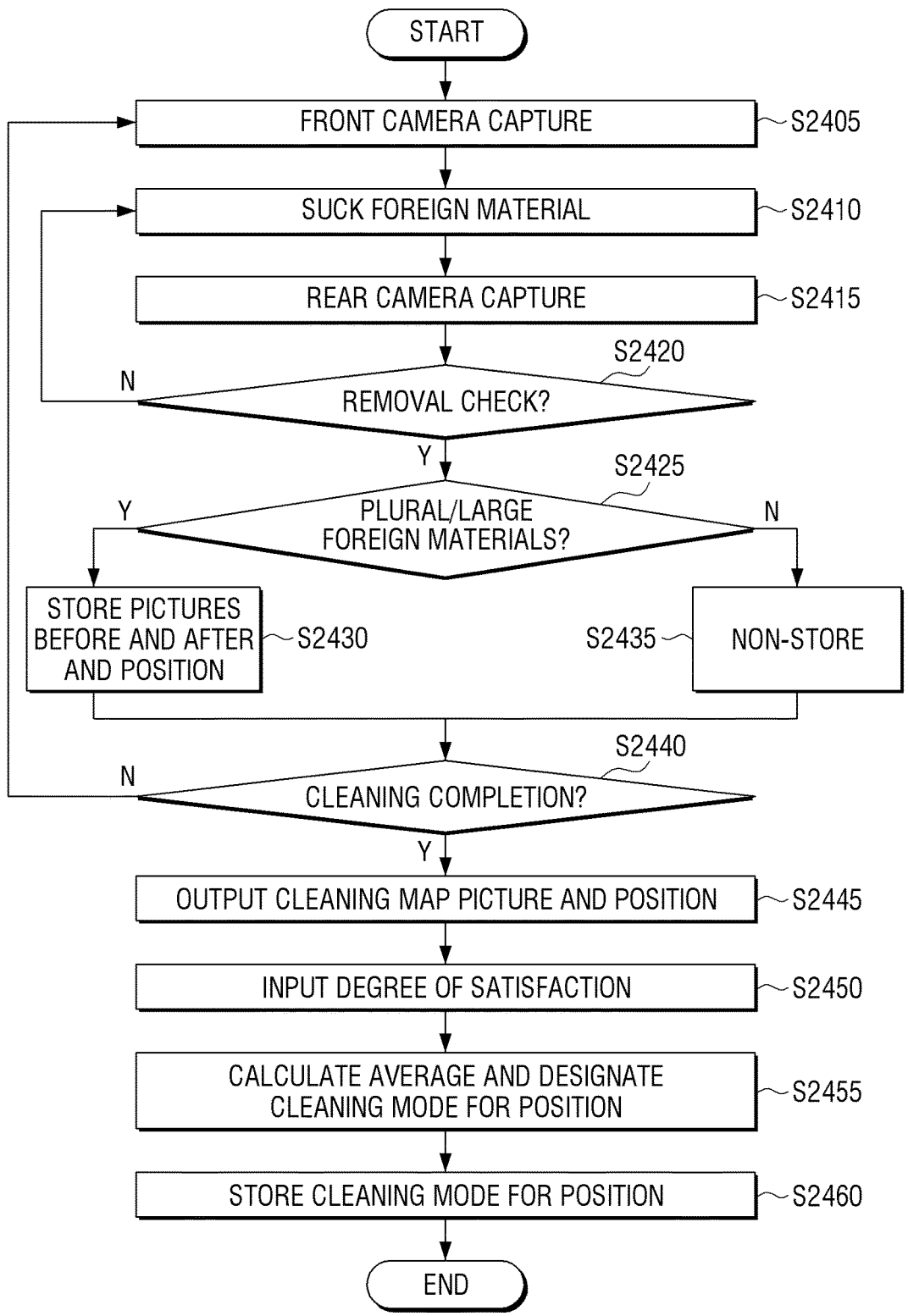

FIG. 24 is a diagram illustrating an operation of detecting an object in response to two capturing units being used.

Referring to FIG. 24, the robot cleaner detects and captures a polluted object during cleaning driving, in step S2405.

The robot cleaner sucks up the corresponding pollution object, in step S2410.

The robot captures a region in which the corresponding object is located using a capturing unit for rear capturing, in step S2415. The robot cleaner determines whether or not the corresponding object is removed through the captured image, in step S2420.

When the object is not removed, the methodology returns to step S2410. When the object is removed, it is determined whether the object is a larger object or a smaller object. When the object is a larger object, the robot cleaner stores the captured image and corresponding position information, in step S2430.

When the object is a smaller object, the robot cleaner does not perform separate image storage, in step S2435.

In step S2440, it is determined whether cleaning is completed. When cleaning is not completed, the methodology returns to step S2405. When cleaning is completed, the robot cleaner simultaneously provides the cleaning map and a position of the region in which the sucked object was located to the user, in step S2445.

In step S2450, a degree of satisfaction is input. In step S2455, an average is calculated and a cleaning mode is designated for the position. In step S2460, a cleaning mode for the position is stored. Thus, the robot cleaner may generate cleaning result information for the corresponding cleaning schedule.

Figure 25:
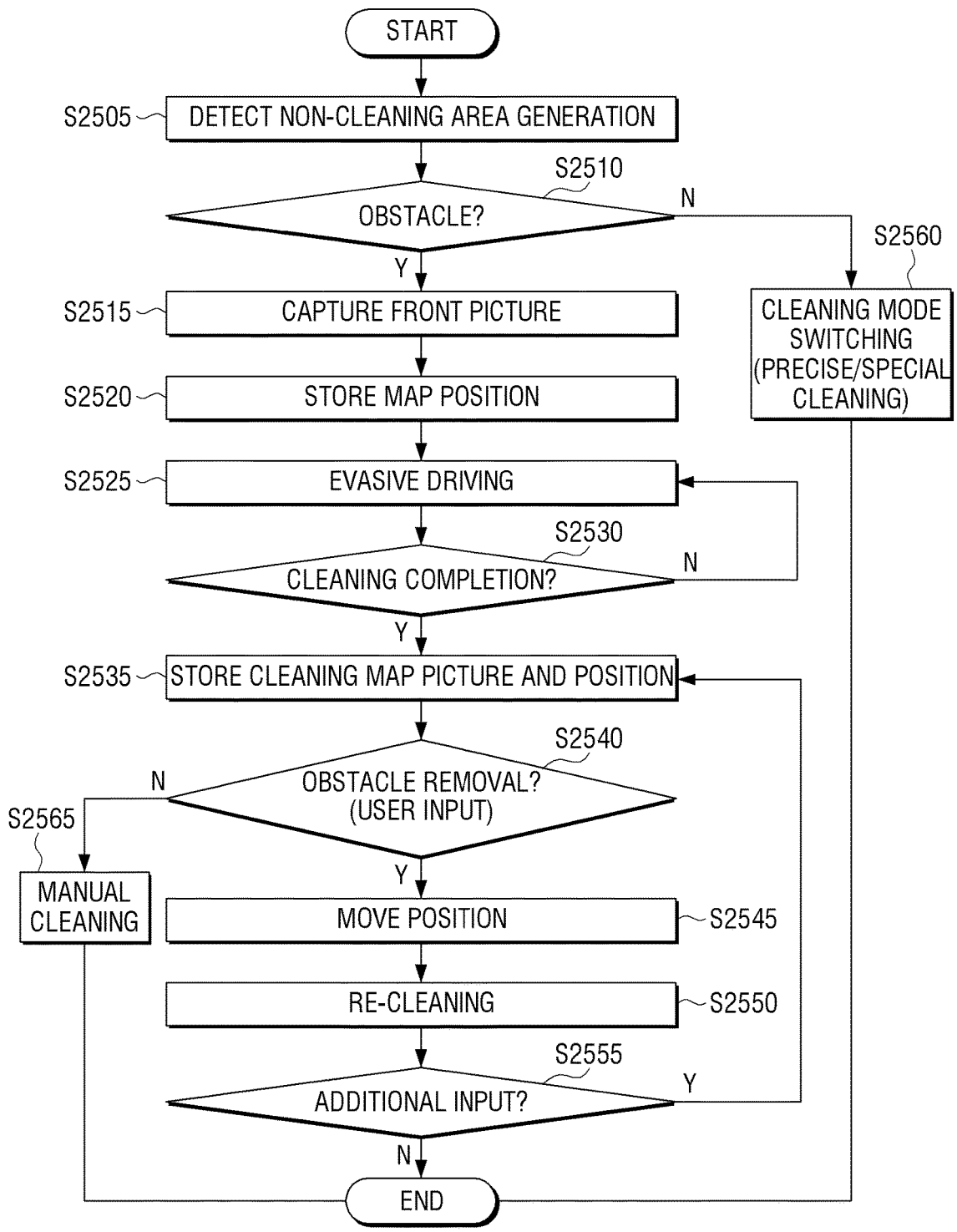

FIG. 25 is a diagram illustrating a cleaning driving operation in response to a suck-prohibited object being detected.

The robot cleaner detects a non-cleaning region, and the robot cleaner may drive to a corresponding area, in step S2505.

In step S2510, it is determined whether an obstacle is detected. When an obstacle is not detected in the corresponding area, the robot cleaner performs a cleaning operation in a general cleaning mode, in step S2560.

When an obstacle is detected in the corresponding area, the robot cleaner captures a picture for the corresponding obstacle, in step S2560.

The robot cleaner stores a position of the corresponding obstacle region, in step S2520, and performs evasive driving around the corresponding position, in step S2525.

In step S2530, it is determined whether cleaning is completed. When cleaning is not completed, the methodology returns to step S2525. When cleaning is completed, the robot cleaner transmits information for the evasive driving region due to the object to the terminal apparatus 200, in step S2535.

In step S2540, it is determined whether the obstacle has been removed. When the obstacle has not been removed, manual cleaning is performed in step S2565. When the obstacle has been removed, the robot cleaner moves the corresponding non-cleaning region, in step S2545, and performs the cleaning on the corresponding non-cleaning region again, in step S2550.

In step S2555, it is determined whether additional input is provided. When additional input is provided, the methodology returns to step S2535. When no additional input is provided, the cleaning operation according to the corresponding schedule is terminated.

Figure 26:
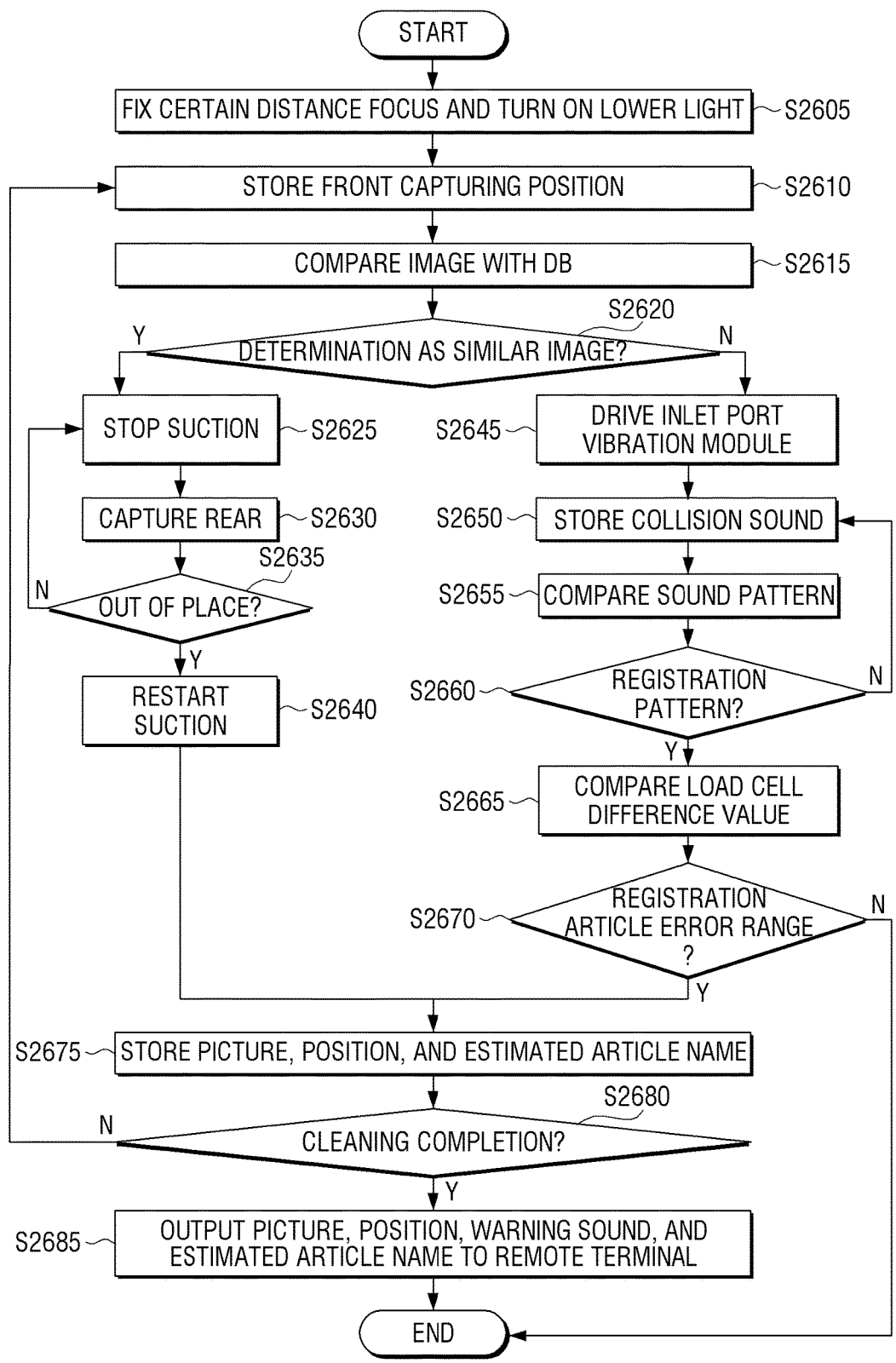

FIG. 26 is a flowchart illustrating an operation of determining a kind of the object.

Referring to FIG. 26, the robot captures an object by fixing a focus to a certain distance, in step S2605.

The robot cleaner stores the captured image, in step S2610, and compares the captured image with a pre-stored object image, in step S2615.

In step S2620, it is determined whether the captured image is similar to the pre-stored object image. When the images are similar, the robot cleaner stops suction for the corresponding object, and performs evasive driving so that the corresponding object is not sucked, in step S2625. The robot cleaner performs capturing to check that the object is not sucked, in step S2630. In step S2635, it is determined whether the robot cleaner is out of the region. When the robot cleaner is not out of the region, the methodology returns to step S2625. When the robot cleaner is out of the region, the robot cleaner restarts the suction, in step S2640. The robot cleaner stores the corresponding object region as the non-cleaning region, in step S2675.

When the images are not similar, the robot cleaner drives the inlet port vibration module, in step S2645, stores a collision sound generated in a suction process of the corresponding object, in step S2650, and compares a sound pattern, in step S2655. In step S2660, it is determined whether the sound pattern is a registered pattern. When the stored pattern is not a registered patter, the methodology returns to step S2650.

The robot cleaner detects a weight of the corresponding object, in step S2665, and verifies the identified object based on the detected weight, in step S2670.

The robot cleaner stores images for the sucked object or the unsucked object in the previous processes and position information of the corresponding objects, in step S2675. In step S2680, it is determined whether cleaning is completed. When cleaning is not completed, the methodology returns to step S2610. When cleaning is completed, the robot cleaner transmits the pre-stored images and the position information to the terminal apparatus 200, in step S2685.

Figure 27:
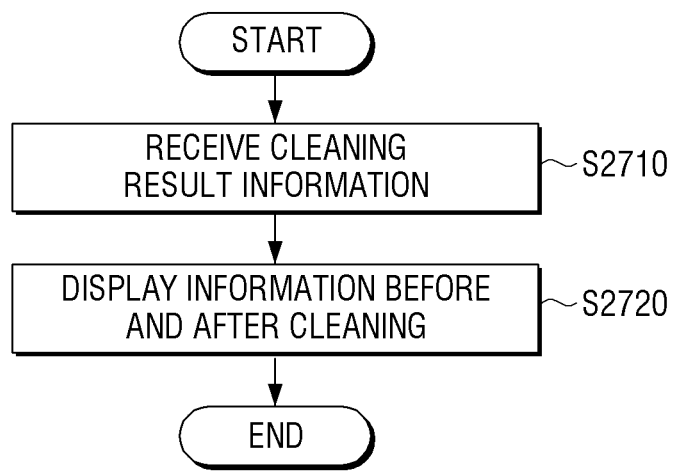
FIG. 27 is a flowchart illustrating a controlling method of a terminal apparatus, according to an embodiment of the present disclosure.

FIG. 27 is a diagram illustrating a controlling method of a terminal apparatus, according to an embodiment of the present disclosure.

Referring to FIG. 27, the robot cleaner 100 is driven according to transmitted cleaning schedule, and thus, the cleaning may be performed. The terminal apparatus receives cleaning result information from the robot cleaner 100, in step S2710. The cleaning result information may include information from which the user can easily check the situations before and after the cleaning. For example, the cleaning result information may include images on the same region before and after cleaning.

In response to the cleaning result information being received, the terminal apparatus displays the received cleaning result information, in step S2720. For example, the terminal apparatus may provide the user interface windows as illustrated in FIGS. 11 to 13 to the user.

The controlling method of the terminal apparatus, according to an embodiment of the present disclosure, may provide the cleaning plan and cleaning result to the user, and thus, the user may easily check the cleaning result, the non-cleaning result, and the like. The controlling method, as illustrated in FIG. 27, may be executed in the terminal apparatus having the configuration of FIG. 8. In another example, the controlling method illustrated in FIG. 27 may be executed in terminal apparatuses having other configurations.

The controlling method, as described above, may be implemented with a program including an algorithm executable in a computer, and the program may be stored in a non-transitory computer readable medium, and provided.

While the present disclosure has been shown and described with reference to certain embodiments thereof, it will be understood by those skilled in the art that various changes in form and detail may be made therein without departing from the spirit and scope of the disclosure as defined by the appended claims.

What is claimed is:

1. A robot cleaner comprising:
a driver configured to move the robot cleaner;
a suction unit configured to suck foreign substances from a surface below the robot cleaner;
a detector configured to capture images of regions disposed in front of the robot cleaner and detect liquid under the robot cleaner; and
a controller configured to control the detector to capture a first image of a region before cleaning, control the detector to capture a second image of the region after cleaning, and generate cleaning result information using the first and second images,
wherein the controller is configured to stop driving the robot cleaner in response to the liquid under the robot cleaner being detected by the detector.

2. The robot cleaner as claimed in claim 1, further comprising a communication interface configured to receive schedule information of a user from a server,
wherein the controller is further configured to generate a cleaning schedule of the robot cleaner based on the schedule information and perform a cleaning job according to the cleaning schedule.

3. The robot cleaner as claimed in claim 2, further comprising a storage unit configured to store a plurality of cleaning schedules to be performed by the robot cleaner,
wherein each of the plurality of cleaning schedules has a different cleaning time.

4. The robot cleaner as claimed in claim 2, wherein:
the suction unit is further configured to perform suction according to a plurality of operation modes;
the communication interface is further configured to receive weather information from the server; and
the controller is further configured to control the suction unit to be operated in one of the plurality of operation modes corresponding to the weather information.

5. The robot cleaner as claimed in claim 1, wherein:
the detector is further configured to detect an object in front of the robot cleaner; and
the controller is further configured to determine whether or not the object is a suckable object, and determine a region in which the object is located as a non-cleanable region when the detected object is not the suckable object.

6. The robot cleaner as claimed in claim 5, wherein, when the object is the suckable object, the controller is further configured to capture the first image of the object, control the driver and the suction unit to suck the object, and control the driver and the detector to capture the second image of the region in which the object was located.

7. The robot cleaner as claimed in claim 5, wherein:
the detector comprises:
a first capturing unit configured to capture regions in front of the robot cleaner; and
a second capturing unit configured to capture regions behind the robot cleaner, which opposite of in front of the robot cleaner, and
when the object is the suckable object, the controller is further configured to capture the first image of the object using the first capturing unit, control the driver and the suction unit to suck the object, and control the second capturing unit to capture the second image of the region in which the object was located after suction of the object.

8. The robot cleaner as claimed in claim 5, wherein the detector is further configured to determine a type of the object based on a sound pattern generated in sucking of the object.

9. The robot cleaner as claimed in claim 1, further comprising a communication interface configured to transmit the cleaning result information to a preset terminal apparatus in response to cleaning being completed.

10. The robot cleaner as claimed in claim 1, wherein:
the detector is further configured to detect a degree of dust on the surface, and
the controller is further configured to determine a cleaning state in a region in which a cleaning job is completed according to the degree of dust detected through the detector.

11. The robot cleaner as claimed in claim 10, wherein the detector comprises:
an air exhaust unit disposed on a bottom side of the robot cleaner and configured to discharge air toward the surface; and a dust sensor configured to detect the degree of dust in the air input to the suction unit.

* * * * *